US012732656B2

(12) United States Patent
Kumpf et al.

(10) Patent No.: US 12,732,656 B2
(45) Date of Patent: Sep. 8, 2026

(54) CONTROLLER APPLICATION MODE SWITCHING

(71) Applicant: Sonos, Inc., Goleta, CA (US)

(72) Inventors: Adam Kumpf, Delaware, OH (US); Roger Jackson, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/827,613

(22) Filed: Sep. 6, 2024

(65) Prior Publication Data

US 2025/0088694 A1 Mar. 13, 2025

Related U.S. Application Data

(60) Provisional application No. 63/581,096, filed on Sep. 7, 2023.

(51) Int. Cl.
*H04N 21/422* (2011.01)

(52) U.S. Cl.
CPC . *H04N 21/42208* (2013.01); *H04N 21/42203* (2013.01); *H04N 21/42222* (2013.01)

(58) Field of Classification Search
None
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |

(Continued)

FOREIGN PATENT DOCUMENTS

| | | | |
|---|---|---|---|
| EP | 1389853 | A1 | 2/2004 |
| WO | 0153994 | A2 | 7/2001 |
| WO | 03093950 | A2 | 11/2003 |

OTHER PUBLICATIONS

AudioTron Quick Start Guide, Version 1.0, Mar. 2001, 24 pages.

(Continued)

*Primary Examiner* — Samira Monshi

(57) ABSTRACT

An example control device is configured to (i) operate in a classic mode of a media playback system (MPS) application in which the control device provides options for controlling the MPS, (ii) while in the classic mode, receive a request to operate in a compact mode of the MPS application, (iii) determine a context in which the control device received the request, (iv) based on the request, transition from operating in the classic mode to the compact mode, in which the control device (a) provides a subset of the options, and (b) based on the context, presents a visualization of the compact mode with a selectable option to play back media content, (v) while presenting the visualization of the compact mode, receive input indicating a selection of the selectable option, and (vi) based on the input, cause a device to play back media content based on the selection.

20 Claims, 16 Drawing Sheets

(56) References Cited

U.S. PATENT DOCUMENTS

| | | | |
|---|---|---|---|
| 6,757,517 B2 | 6/2004 | Chang | |
| 6,778,869 B2 | 8/2004 | Champion | |
| 7,130,608 B2 | 10/2006 | Hollström et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty | |
| 2004/0024478 A1 | 2/2004 | Hans et al. | |
| 2007/0142944 A1 | 6/2007 | Goldberg et al. | |
| 2013/0171981 A1* | 7/2013 | Woo | G08C 17/02 455/420 |
| 2018/0115844 A1* | 4/2018 | Lu | H04R 3/12 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *D&M Holdings* (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

CONTROLLER APPLICATION MODE SWITCHING

CROSS-REFERENCE TO RELATED APPLICATIONS

This application claims priority to U.S. Provisional Application No. 63/581,096, filed Sep. 7, 2023, and titled "Controller Application Mode Switching," the contents of which are incorporated herein by reference in their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

DETAILED DESCRIPTION

I. Overview

Figure 1A:
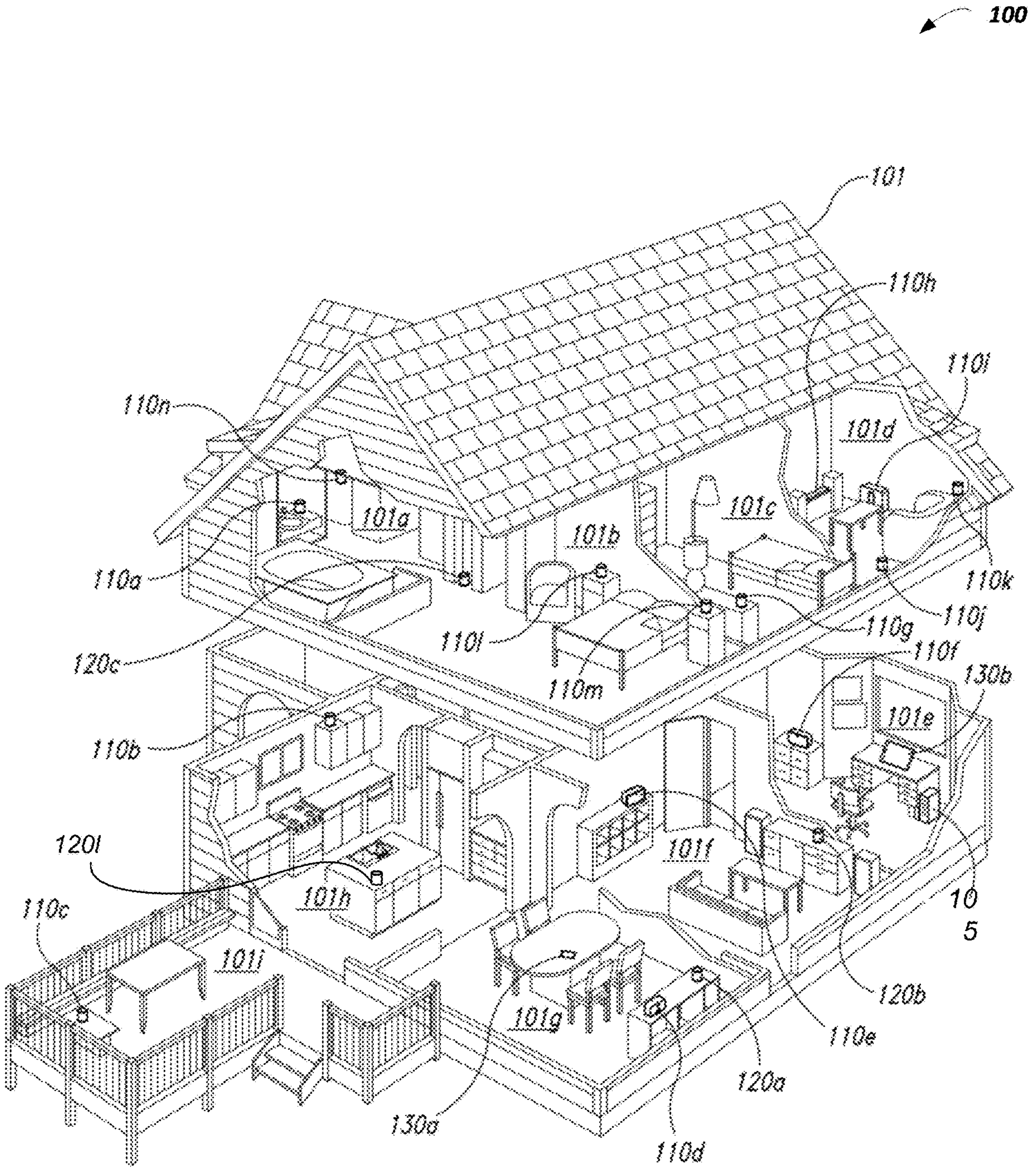
FIG. 1A is a partial cutaway view of an environment having a media playback system configured in accordance with aspects of the disclosed technology.

Over the years, Sonos, Inc. ("Sonos") has been an innovator in creating sound systems that are capable of delivering personalized listening experiences to users.

For example, in addition to offering a wide variety of unique playback devices that are each designed to provide different listening experiences, Sonos also offers a unique media playback system (MPS) controller application that may be installed on a control device, such as a smartphone. This MPS controller application enables users to curate a personalized listening profile to, among various other things, manage their listening portfolios. The MPS controller application includes various features, enabling users to perform actions such as (i) searching for and discovering media content, (ii) organizing media content into playlists or the like, (iii) causing media content to be played back by one or more playback devices of a media playback system, (iv) grouping and ungrouping playback devices for synchronous playback of media content, and (v) controlling various settings and configurations of the media playback system (e.g., associated media sources, playback settings, playback device calibration, pre-defined device groups, alarms, etc.), among various other things.

The comprehensive set of features provided by Sonos' MPS controller application, paired with the wide variety of unique playback devices that Sonos offers, provides users with a set of tools to customize their listening experience with a high degree of granularity. This allows users to tune their media playback system to their specific listening preferences.

However, the various different users of Sonos products and services may have differing levels of interest in the comprehensive set of features Sonos products and services provide. While some users may appreciate and utilize the comprehensive set of features of Sonos' MPS controller application (at least some of the time), other users may not need or desire to use such comprehensive functionality. Indeed, some users may feel overwhelmed trying to navigate through the set of features of Sonos' MPS controller application. Further, even users who utilize the comprehensive set of features of Sonos' MPS controller application may only do so occasionally (e.g., during setup), and may at other times be interested in only a portion of the comprehensive set of features.

Further, in some instances, a user may desire to use certain features of Sonos' MPS controller application while also utilizing various other applications, such as a calendar application or a meal planning application, among various other examples. Navigating back and forth between the various interfaces and menus of various applications can be time consuming, frustrating, and inefficient.

To address these and other issues, new techniques are discussed below that provide for a control device to be configurable to operate according to separate modes of a MPS controller application installed on the control device, such as a "classic" mode and a "compact" mode. While operating in the classic mode of the MPS controller application, the control device may be configured to perform operations to enable the comprehensive set of features of the MPS controller application, many of which are discussed in further detail below.

While operating in the compact mode of the MPS controller application, the control device may provide an on-demand control experience that is contextualized to unique scenarios that the user of the control device may be in. Further, the control device may support fewer media playback system features as compared to the extent of media playback system features that the control device is configured to support while operating in the classic mode, so as to provide a more simplified media playback system control experience. Further, in some implementations, the control device may be configured to perform operations that support additional features, via the MPS control application, that are not associated with the media playback system. For example, the control device may support, via the MPS control application, various interactions with third-party applications while operating in the compact mode of the MPS controller application in ways that are not supported while operating in the classic mode of the MPS controller application.

The various operations that the control device may be configured to perform in each of these modes of the MPS controller application (i.e., the classic mode and the compact mode) are described in greater detail below. In some embodiments, for example, a playback device is provided including at least one processor, a wireless network interface, a non-transitory computer-readable medium, and program instructions stored on the non-transitory computer-readable medium that are executable by the at least one processor such that the playback device is configured to (i) operate in a classic mode of a media playback system controller application in which the control device is configured to provide a set of options for controlling the media playback system, (ii) while operating in the classic mode of the media playback system controller application, receive a request to operate in a compact mode of the media playback system controller application, (iii) determine a context in which the control device received the request to operate in the compact mode of the media playback system controller application, wherein the context is associated with listening preference data for a user account associated with the control device, (iv) based on the request, transition from operating in the classic mode of the media playback system controller application to operating in the compact mode of the media playback system controller application, in which the control device (a) is configured to provide a subset of options of the set of options for controlling the media playback system, and (b) presents a visualization of the compact mode of the media playback system controller application that includes a selectable option to play back media content, wherein the visualization of the compact mode of the media playback system control application is based on the determined context, (v) while presenting the visualization of the compact mode of the media playback system controller application, receive user input indicating a selection of the selectable option to play back media content, and (vi) based on the user input, cause at least a first playback device of a media playback system controlled by the control device to play back media content based on the selection of the selectable option.

In another aspect, a non-transitory computer-readable medium in provided. The non-transitory computer-readable medium is provisioned with program instructions that, when executed by at least one processor, cause a playback device to (i) operate in a classic mode of a media playback system controller application in which the control device is configured to provide a set of options for controlling the media playback system, (ii) while operating in the classic mode of the media playback system controller application, receive a request to operate in a compact mode of the media playback system controller application, (iii) determine a context in which the control device received the request to operate in the compact mode of the media playback system controller application, wherein the context is associated with listening preference data for a user account associated with the control device, (iv) based on the request, transition from operating in the classic mode of the media playback system controller application to operating in the compact mode of the media playback system controller application, in which the control device (a) is configured to provide a subset of options of the set of options for controlling the media playback system, and (b) presents a visualization of the compact mode of the media playback system controller application that includes a selectable option to play back media content, wherein the visualization of the compact mode of the media playback system control application is based on the determined context, (v) while presenting the visualization of the compact mode of the media playback system controller application, receive user input indicating a selection of the selectable option to play back media content, and (vi) based on the user input, cause at least a first playback device of a media playback system controlled by the control device to play back media content based on the selection of the selectable option.

In yet another aspect, a method carried out by a playback device includes, (i) operating in a classic mode of a media playback system controller application in which the control device is configured to provide a set of options for controlling the media playback system, (ii) while operating in the classic mode of the media playback system controller application, receiving a request to operate in a compact mode of the media playback system controller application, (iii) determining a context in which the control device received the request to operate in the compact mode of the media playback system controller application, wherein the context is associated with listening preference data for a user account associated with the control device, (iv) based on the request, transitioning from operating in the classic mode of the media playback system controller application to operating in the compact mode of the media playback system controller application, in which the control device (a) is configured to provide a subset of options of the set of options for controlling the media playback system, and (b) presents a visualization of the compact mode of the media playback system controller application that includes a selectable option to play back media content, wherein the visualization of the compact mode of the media playback system control application is based on the determined context, (v) while presenting the visualization of the compact mode of the media playback system controller application, receiving user input indicating a selection of the selectable option to play back media content, and (vi) based on the user input, causing at least a first playback device of a media playback system controlled by the control device to play back media content based on the selection of the selectable option.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

In the figures, identical reference numbers identify generally similar, and/or identical, elements. To facilitate the discussion of any particular element, the most significant digit or digits of a reference number refers to the figure in which that element is first introduced. For example, element 110*a* is first introduced and discussed with reference to FIG. 1A. Many of the details, dimensions, angles and other features shown in the figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment a. Suitable Media Playback System

Figure 1B:
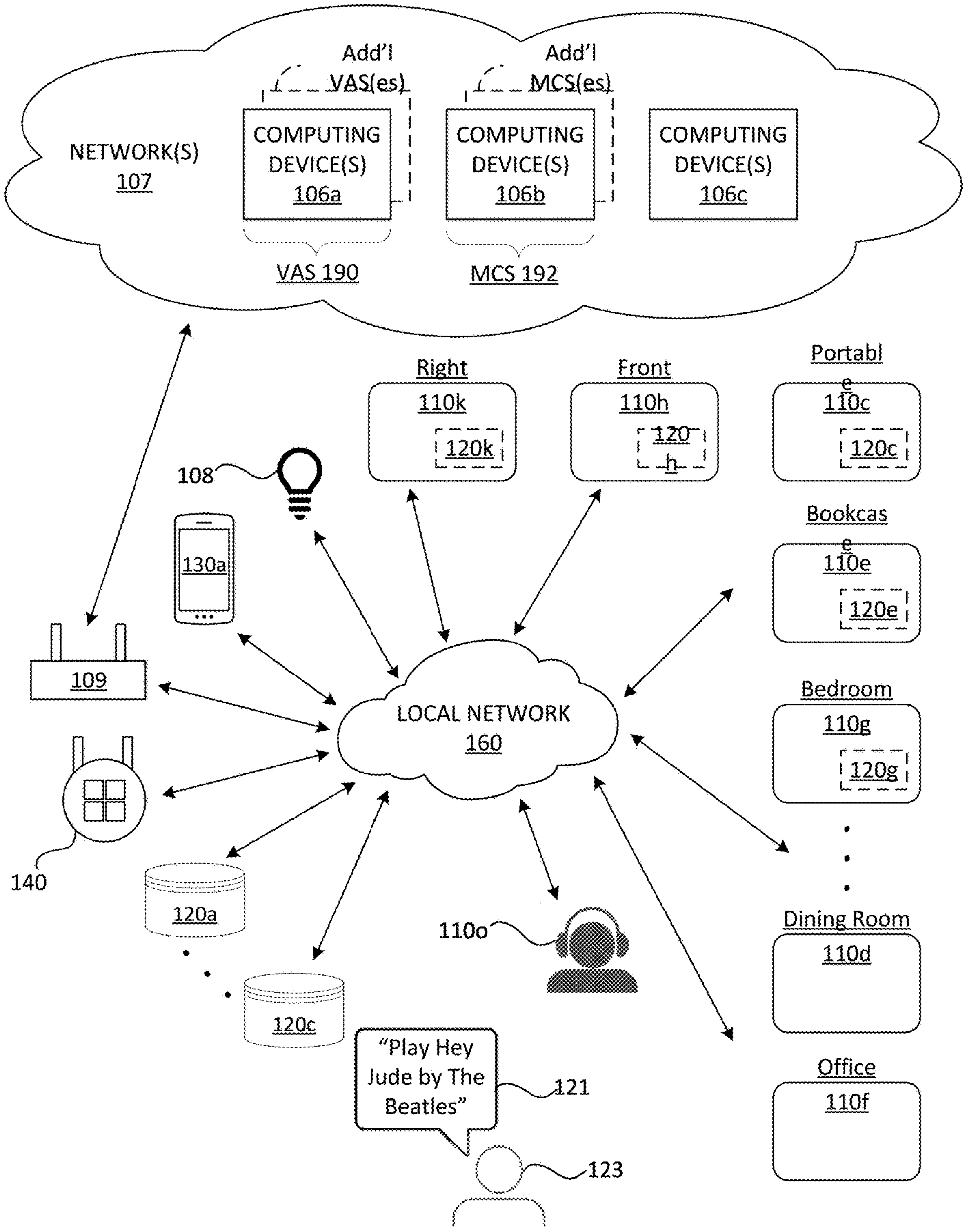
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110*a-o*), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes media content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 110*a*) in synchrony with a second playback device (e.g., the playback device 110*b*). Interactions between the playback devices 110, NMDs 120, and/or control devices 130 of the MPS 100 configured in accordance with the various embodiments of the disclosure are described in greater detail below with respect to FIGS. 1B-1N.

In the illustrated embodiment of FIG. 1A, the environment 101 comprises a household having several rooms, spaces, and/or playback zones, including (clockwise from upper left) a Master Bathroom 101*a*, a Master Bedroom 101*b*, a Second Bedroom 101*c*, a Family Room or Den 101*d*, an Office 101*e*, a Living Room 101*f*, a Dining Room 101*g*, a Kitchen 101*h*, and an outdoor Patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added and/or removed to form, for example, the configuration shown in FIG. 1A. Each zone may be given a name according to a different room or space such as the Office 101*e*, Master Bathroom 101*a*, Master Bedroom 101*b*, the Second Bedroom 101*c*, Kitchen 101*h*, Dining Room 101*g*, Living Room 101*f*, and/or the Patio 101*i*. In some aspects, a single playback zone may include multiple rooms or spaces. In certain aspects, a single room or space may include multiple playback zones.

In the illustrated embodiment of FIG. 1A, the Master Bathroom 101*a*, the Second Bedroom 101*c*, the Office 101*e*, the Living Room 101*f*, the Dining Room 101*g*, the Kitchen 101*h*, and the outdoor Patio 101*i* each include one playback device 110, and the Master Bedroom 101*b* and the Den 101*d* include a plurality of playback devices 110. In the Master Bedroom 101*b*, the playback devices 110*l* and 110*m* may be configured, for example, to play back media content in synchrony as individual ones of playback devices 110, as a bonded playback zone, as a consolidated playback device, and/or any combination thereof. Similarly, in the Den 101*d*, the playback devices 110*h-j* can be configured, for instance, to play back media content in synchrony as individual ones of playback devices 110, as one or more bonded playback devices, and/or as one or more consolidated playback devices.

Referring to FIG. 1B, the home environment may include additional and/or other control devices, including local network devices, such as one or more smart illumination devices 108 (FIG. 1B), a smart thermostat 140 (FIG. 1B), and a local control device 105 (FIG. 1A). Numerous other examples of local network devices (not shown) are also possible, such as doorbells, cameras, smoke alarms, televisions, gaming consoles, garage door openers, etc. In embodiments described below, one or more of the various playback devices 110 may be configured as portable playback devices, while others may be configured as stationary playback devices. For example, the headphones 1100 (FIG. 1B) are a portable playback device, while the playback device 110*e* on the bookcase may be a stationary device. As another example, the playback device 110*c* on the Patio 101*i* may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110*j* in the Den 101*d* (FIG. 1A), which may be designated as the "Left" device, may have a point-to-point connection with the playback device 110*k*, which is also in the Den 101*d* and may be designated as the "Right" device. In a related embodiment, the Left playback device 110*j* may communicate with other network devices, such as the playback device 110*h*, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WIFI network, a Z-Wave network, etc.) and/or one or more personal area networks (PANs) (e.g., a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote control devices 106 via a wide area network ("WAN") 107. In some embodiments, each remote control device 106 may take the form of one or more cloud servers. The remote control devices 106 may be configured to interact with control devices in the environment 101 in various ways. For example, the remote control devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote control device associated with a voice assistant service ("VAS") and/or at least one remote control device associated with a media content service ("MCS"). For instance, in the illustrated example of FIG. 1B, remote control devices 106*a* are associated with a VAS 190 and remote control devices 106*b* are associated with an MCS 192. Although only a single VAS 190 and a single MCS 192 are shown in the example of FIG. 1B for purposes of clarity, the MPS 100 may be coupled to any number of different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the control devices 106*a* may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY®, PANDORA®, AMAZON MUSIC®, YOUTUBE MUSIC, APPLE MUSIC®, GOOGLE PLAY®, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WIFI network). In some embodiments, the MPS 100 is implemented without the local network 160, and the various devices comprising the MPS 100 can communicate with each other, for example, via one or more direct connections, PANs, telecommunication networks (e.g., an LTE network or a 5G network, etc.), and/or other suitable communication links.

In some embodiments, media content sources may be regularly added and/or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote control devices 106 further include remote control device(s) 106*c* configured to perform certain operations, such as remotely facilitating media playback functions, managing device and system status information, directing communications between the devices of the MPS 100 and one or multiple VASes and/or MCSes, among other operations. In one example, the remote control devices 106*c* provide cloud servers for one or more SONOS Wireless HiFi Systems.

In various implementations, one or more of the playback devices 110 may take the form of or include an on-board (e.g., integrated) network microphone device configured to detect sound, including voice utterances from a user. For example, the playback devices 110*c*-110*h*, and 110*k* include or are otherwise equipped with corresponding NMDs 120*c*-120*h*, and 120*k*, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 1201 (FIG. 1A) may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110*e* because it is physically situated on a bookcase. Similarly, the NMD 1201 may be assigned the named "Island" because it is physically situated on an island countertop in the Kitchen 101*h* (FIG. 1A). Some playback devices may be assigned names according to a zone or room, such as the playback devices 110*g*, 110*d*, and 110*f*, which are named "Bedroom," "Dining Room," and "Office," respectively. Further, certain playback devices may have functionally descriptive names. For example, the playback devices 110*k* and 110*h* are assigned the names "Right" and "Front," respectively, because these two devices are configured to provide specific audio channels during media playback in the zone of the Den 101*d* (FIG. 1A). The playback device 110*c* in the Patio 101*i* may be named "Portable" because it is battery-powered and/or readily transportable to different areas of the environment 101. Other naming conventions are possible.

As discussed above, an NMD may detect and process sound from its environment, including audio output played by itself, played by other devices in the environment 101, and/or sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word (also referred to herein as an activation word) associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote control devices 106*c* of the MPS 100 may exchange various feedback, information, instructions, and/or related data with the remote control devices associated with the selected VAS. Such exchanges may be related to or independent of transmitted messages containing voice inputs. In some embodiments, the remote control device(s) and the MPS 100 may exchange data via communication paths as described herein and/or using a metadata exchange channel as described in U.S. Pat. No. 10,499,146, issued Nov. 13, 2019 and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude" performed by The Beatles. After these determinations, the VAS 190 may transmit a command to a particular MCS 192 to retrieve content (i.e., the song "Hey Jude" by The Beatles), and that MCS 192, in turn, provides (e.g., streams) this content directly to the NIPS 100 or indirectly via the VAS 190. In some implementations, the VAS 190 may transmit to the NIPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110*e* in the environment 101 (FIG. 1A) is in relatively close proximity to the NMD-equipped Living Room playback device 120*b*, and both devices 110*e* and 120*b* may at least sometimes detect the same sound. In such cases, this may require arbitration as to which device is ultimately responsible for providing detected-sound data to the remote VAS. Examples of arbitrating between NMDs may be found, for example, in previously referenced U.S. Pat. No. 10,499,146.

In certain implementations, an NMD may be assigned to, or otherwise associated with, a designated or default playback device that may not include an NMD. For example, the Island NMD 1201 in the Kitchen 101*h* (FIG. 1A) may be assigned to the Dining Room playback device 110*d*, which is in relatively close proximity to the Island NMD 1201. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Pat. No. 10,499,146.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote control devices 106*a*-*c*. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

Figure 1C:
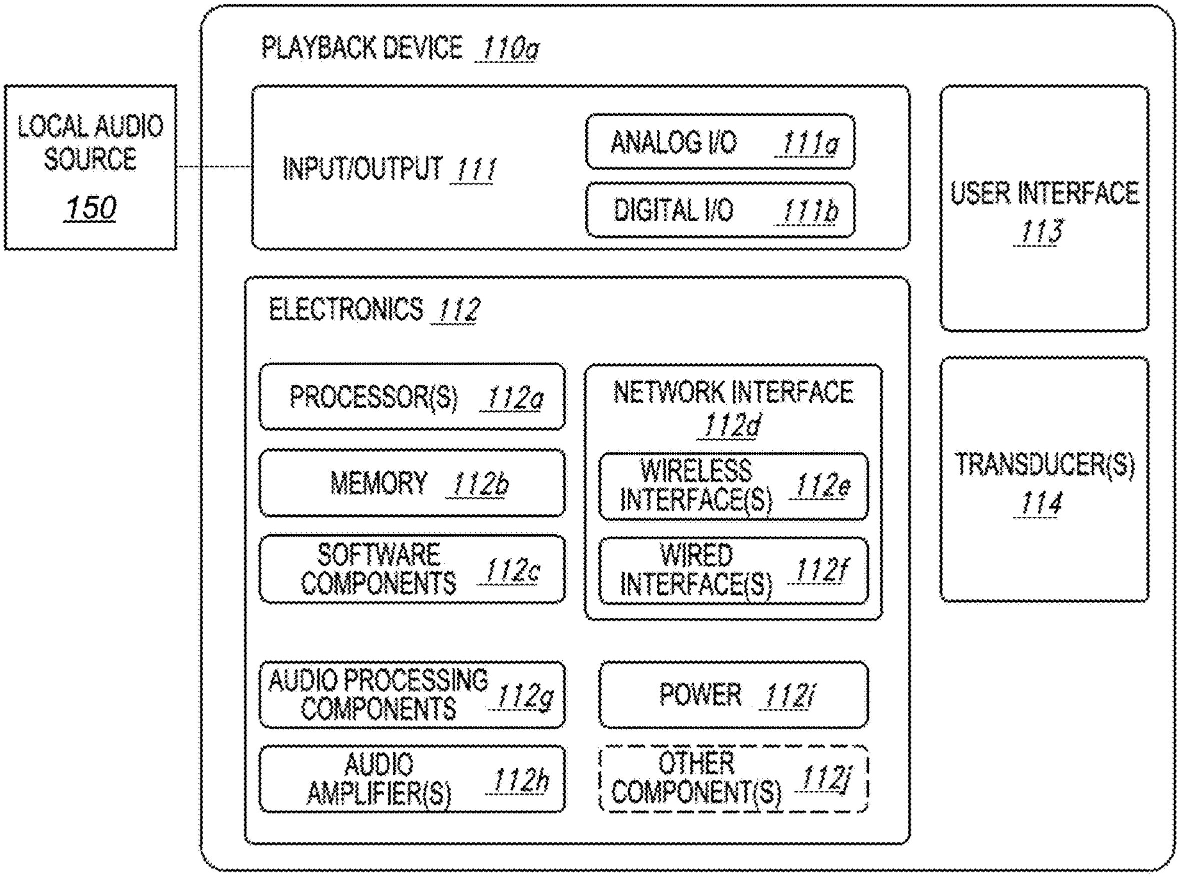
FIG. 1C is a block diagram of an example playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WIFI, BLUETOOTH, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., media content comprising music and/or other sounds) from a local audio source 150 via the input/output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110*a* does not include an input/output 111 and receives all media content via the local network 160.

The playback device 110*a* further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the control devices 106*a*-*c* via the local network 160 (FIG. 1B), amplify the received audio, and output the amplified audio for playback via one or more of the transducers 114. In some embodiments, the playback device 110*a* optionally includes one or more microphones (e.g., a single microphone, a plurality of microphones, a microphone array) (hereinafter referred to as "the microphones"). In certain embodiments, for example, the playback device 110*a* having one or more of the optional microphones can operate as an NMD configured to receive voice input from a user and correspondingly perform one or more operations based on the received voice input, which will be discussed in more detail further below with respect to FIGS. 1F and 1G.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g*, one or more audio amplifiers 112*h* (referred to hereinafter as "the amplifiers 112*h*"), and power components 112*i* (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112*j* (e.g., one or more sensors, video displays, touchscreens, battery charging bases). In some embodiments, the playback device 110*a* and electronics 112 may further include one or more voice processing components that are operably coupled to one or more microphones, and other components as described below with reference to FIGS. 1F and 1G.

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the control devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of media content with another of the one or more playback devices 110. As those of ordinary skill in the art will appreciate, during synchronous playback of media content on a plurality of playback devices, a listener will preferably be unable to perceive time-delay differences between playback of the media content by the playback device 110*a* and the other one or more other playback devices 110. Additional details regarding audio playback synchronization among playback devices and/or zones can be found, for example, in U.S. Pat. No. 8,234,395 entitled "System and method for synchronizing operations among a plurality of independently clocked digital data processing devices," which is herein incorporated by reference in its entirety.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112*d* is configured to facilitate a transmission of data between the playback device 110*a* and one or more other devices on a data network. The network interface 112*d* is configured to transmit and receive data corresponding to media content (e.g., media content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WIFI, BLUETOOTH, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio processing components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

In some implementations, the power components 112*i* of the playback device 110*a* may additionally include an internal power source (e.g., one or more batteries) configured to power the playback device 110*a* without a physical connection to an external power source. When equipped with the internal power source, the playback device 110*a* may operate independent of an external power source. In some such implementations, an external power source interface may be configured to facilitate charging the internal power source. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more light components (e.g., LEDs) and the speakers to provide visual and/or audio feedback to a user.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110*a* may include a speaker interface for connecting the playback device to external speakers. In other embodiments, the playback device 110*a* may include an audio interface for connecting the playback device to an external audio amplifier or audio-visual receiver.

Figure 1D:
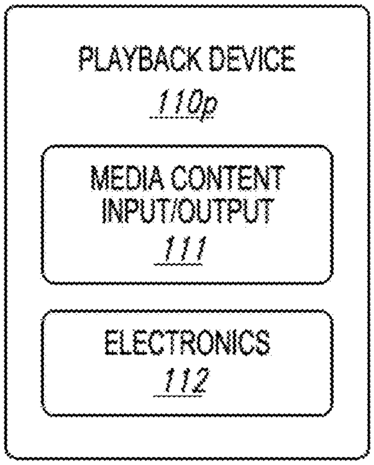
FIG. 1D is a block diagram of an example playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," "SUB," "BEAM," "ARC," "MOVE," and "ROAM," among others. Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more of the playback devices 110 may comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device may omit a user interface and/or one or more transducers. For example, FIG. 1D is a block diagram of a playback device 110*p* comprising the input/output 111 and electronics 112 without the user interface 113 or transducers 114.

Figure 1E:
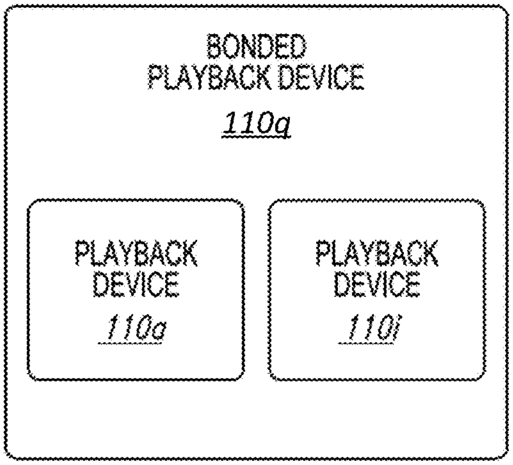
FIG. 1E is a block diagram of an example playback device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency media content, and the playback device 110*i* is a subwoofer configured to render low frequency media content. In some aspects, the playback device 110*a*, when bonded with playback device 110*i*, is configured to render only the mid-range and high frequency components of a particular media content, while the playback device 110*i* renders the low frequency component of the particular media content. In some embodiments, the bonded playback device 110*q* includes additional playback devices and/or another bonded playback device.

Figure 2:
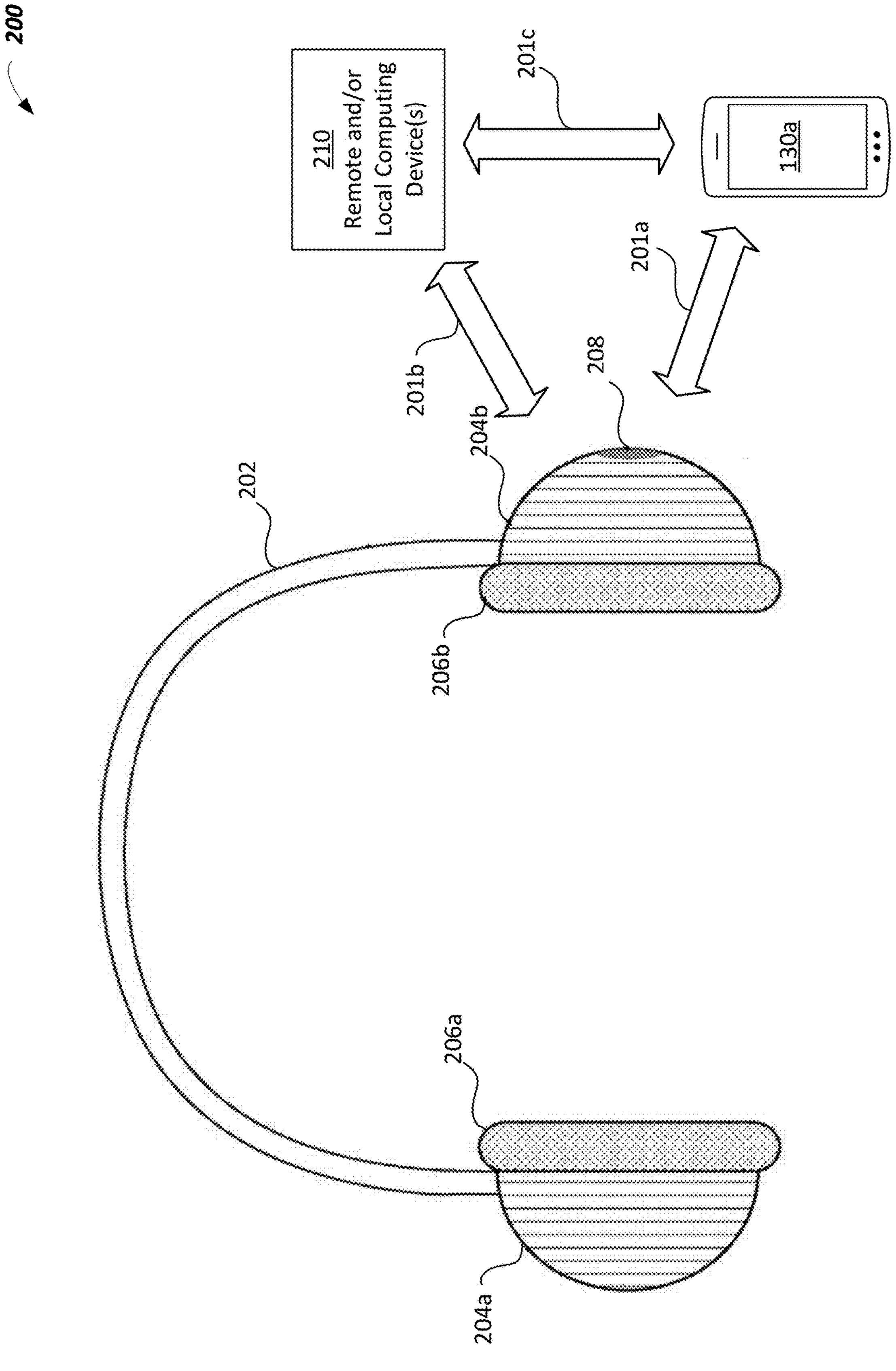
FIG. 2 is a diagram of an example headset assembly for an example playback device.

In some embodiments, one or more of the playback devices 110 may take the form of a wired and/or wireless headphone device (e.g., over-ear headphones, on-ear headphones, in-ear earphones, etc.). For instance, FIG. 2 shows an example headset assembly 200 ("headset 200") for such an implementation of one of the playback devices 110. As shown, the headset 200 includes a headband 202 that couples a first earcup 204*a* to a second earcup 204*b*. Each of the earcups 204*a* and 204*b* may house any portion of the electronic components in the playback device 110, such as one or more speakers. Further, one or both of the earcups 204*a* and 204*b* may include a user interface for controlling audio playback, volume level, and other functions. The user interface may include any of a variety of control elements such as a physical button 208, a slider (not shown), a knob (not shown), and/or a touch control surface (not shown). As shown in FIG. 2, the headset 200 may further include ear cushions 206*a* and 206*b* that are coupled to earcups 204*a* and 204*b*, respectively. The ear cushions 206*a* and 206*b* may provide a soft barrier between the head of a user and the earcups 204*a* and 204*b*, respectively, to improve user comfort and/or provide acoustic isolation from the ambient (e.g., passive noise reduction (PNR)).

As described in greater detail below, the electronic components of a playback device may include one or more network interface components (not shown in FIG. 2) to facilitate wireless communication over one more communication links. For instance, a playback device may communicate over a first communication link 201*a* (e.g., a BLUETOOTH link) with one of the control devices 130, such as the control device 130*a*, and/or over a second communication link 201*b* (e.g., a WIFI or cellular link) with one or more other control devices 210 (e.g., a network router and/or a remote server). As another possibility, a playback device may communicate over multiple communication links, such as the first communication link 201*a* with the control device 130*a* and a third communication link 201*c* (e.g., a WIFI or cellular link) between the control device 130*a* and the one or more other control devices 210. Thus, the control device 130*a* may function as an intermediary between the playback device and the one or more other control devices 210, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone device. Wearable devices may include those devices configured to be worn about a portion of a user (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMDs)

Figure 1F:
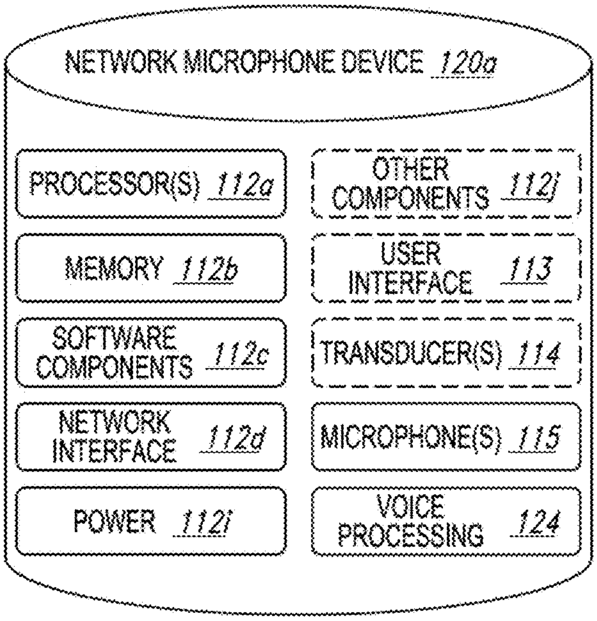
FIG. 1F is a block diagram of an example network microphone device.

FIG. 1F is a block diagram of the NMD 120*a* (FIGS. 1A and 1B). The NMD 120*a* includes one or more voice processing components 124 and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio processing components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1C. In some aspects, for example, the NMD 120*a* includes the processor 112*a* and the memory 112*b* (FIG. 1C), while omitting one or more other components of the electronics 112. In some embodiments, the NMD 120*a* includes additional components (e.g., one or more sensors, cameras, thermometers, barometers, hygrometers).

Figure 1G:
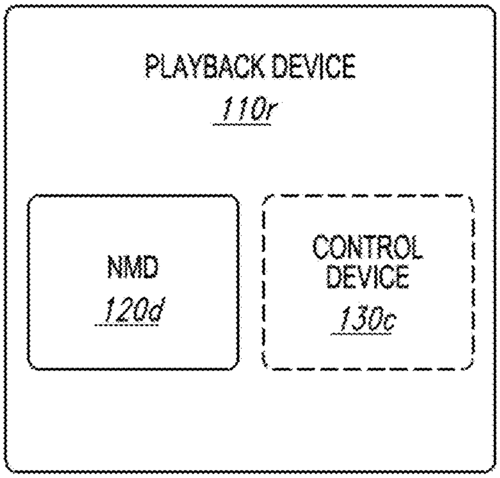
FIG. 1G is a block diagram of an example playback device.

In some embodiments, an NMD can be integrated into a playback device. FIG. 1G is a block diagram of a playback device 110*r* comprising an NMD 120*d*. The playback device 110*r* can comprise any or all of the components of the playback device 110*a* and further include the microphones 115 and voice processing components 124 (FIG. 1F). The microphones 115 are configured to detect sound (i.e., acoustic waves) in the environment of the playback device 110*r*, which may then be provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110*r* may include fewer than six microphones or more than six microphones. The playback device 110*r* optionally includes an integrated control device 130*c*. The control device 130*c* can comprise, for example, a user interface configured to receive user input (e.g., touch input, voice input) without a separate control device. In other embodiments, however, the playback device 110*r* receives commands from another control device (e.g., the control device 130*a* of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112*a*.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Pat. No. 10,499,146.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The NMD 120*a* may use the microphone data (or transmit the microphone data to another device) for calibrating the audio characteristics of one or more playback devices 110 in the MPS 100. As another example, one or more of the playback devices 110, NMDs 120, and/or control devices 130 of the MPS 100 may transmit audio tones (e.g., ultrasonic tones, infrasonic tones) that may be detectable by the microphones 115 of other devices, and which may convey information such as a proximity and/or identity of the transmitting device, a media playback system command, etc. As yet another example, the voice processing components 124 may receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

Figure 1H:
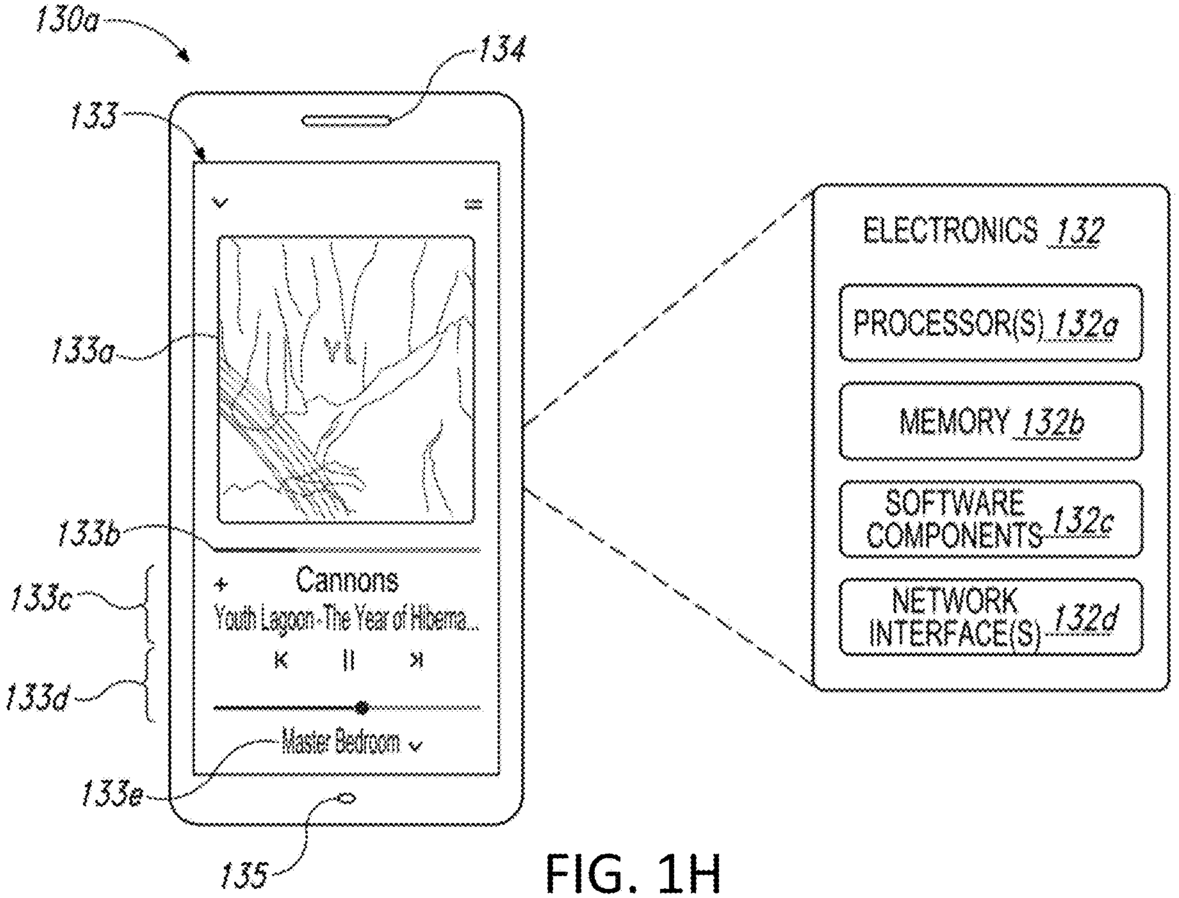
FIG. 1H is a partially schematic diagram of an example control device.

FIG. 1H is a partially schematic diagram of one example of the control device 130*a* (FIGS. 1A and 1B). As used herein, the term "control device" can be used interchangeably with "controller," "controller device," or "control system." Among other features, the control device 130*a* is configured to receive user input related to the MPS 100 and, in response, cause one or more devices in the MPS 100 to perform an action(s) and/or an operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device, a smartwatch, etc.). In certain embodiments, the control device 130*a* comprises a dedicated controller for the MPS 100. In other embodiments, as described above with respect to FIG. 1G, the control device 130*a* is integrated into another device in the MPS 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processor(s) 132*a*"), a memory 132*b*, software components 132*c*, and a network interface 132*d*. The processor(s) 132*a* can be configured to perform functions relevant to facilitating user access, control, and configuration of the MPS 100. The memory 132*b* can comprise data storage that can be loaded with one or more of the software components executable by the processors 132*a* to perform those functions. The software components 132*c* can comprise applications and/or other executable software configured to facilitate control of the MPS 100. The memory 132*b* can be configured to store, for example, the software components 132*c*, media playback system controller application software, and/or other data associated with the MPS 100 and the user.

The network interface 132*d* is configured to facilitate network communications between the control device 130*a* and one or more other devices in the MPS 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132*d* can be configured, for example, to transmit data to and/or receive data from the playback devices 110, the NMDs 120, other ones of the control devices 130, one of the control devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, media content selection) from the control device 130*a* to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among other changes. Additional description of zones and groups can be found below with respect to FIGS. 1J through 1N.

Figure 1I:
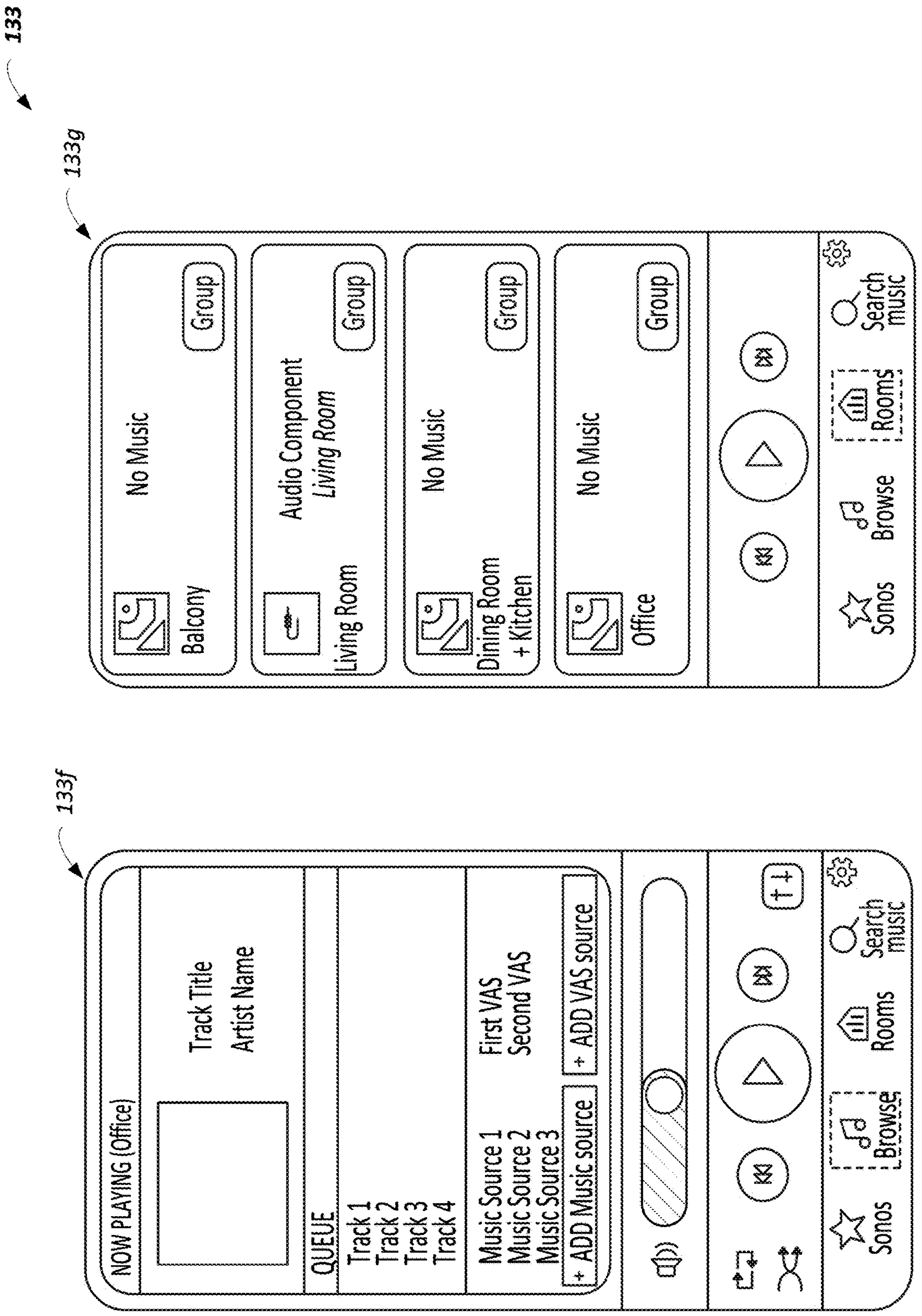
FIG. 1I is a schematic diagram of example user interfaces of the example control device of FIG. 1H.

The user interface 133 is configured to receive user input and can facilitate control of the MPS 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone, etc.). In some embodiments, however, user interfaces of varying formats, styles, and interactive sequences may alternatively be implemented on one or more network devices to provide comparable control access to a media playback system. FIG. 1I shows two additional example user interface displays 133*f* and 133*g* of user interface 133. Additional examples are also possible.

The one or more speakers 134 (e.g., one or more transducers) can be configured to output sound to the user of the control device 130*a*. In some embodiments, the one or more speakers 134 comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device, etc.) comprising a portion of the electronics 132 and the user interface 133 (e.g., a touch screen) without any speakers or microphones.

e. Suitable Playback Device Configurations

Figure 1J:
FIGS. 1J through 1M are schematic diagrams of example media playback system zones.
Figure 1K:
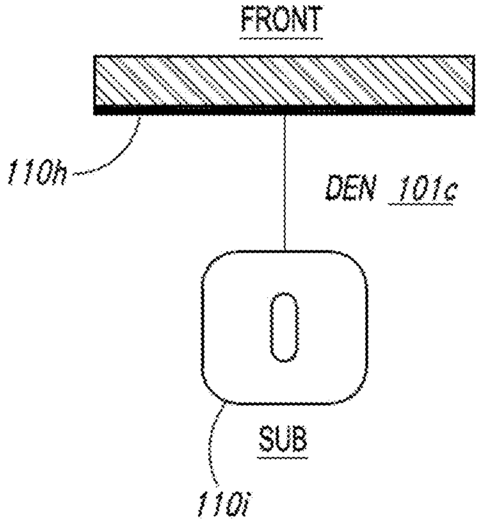
Figure 1L:
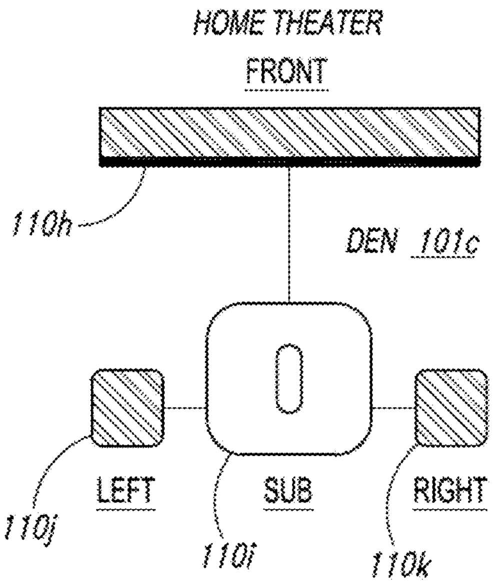
Figure 1M:
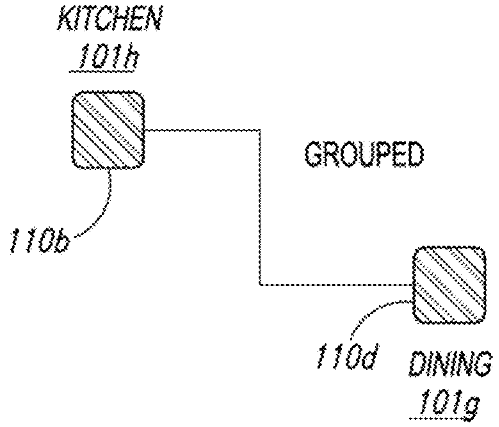
Figure 1N:
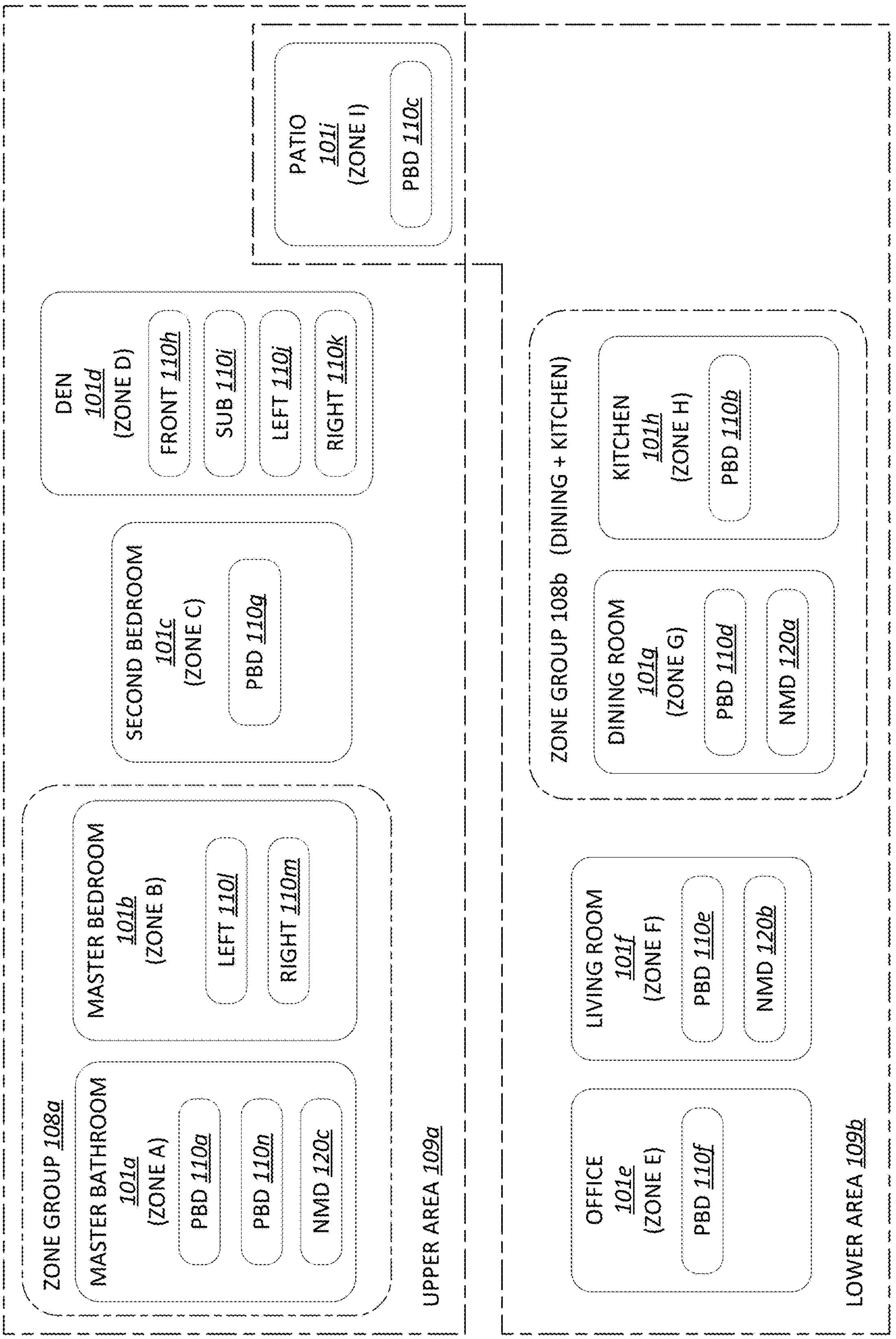
FIG. 1N is a schematic diagram of example media playback system areas.

FIGS. 1J, 1K, 1L, 1M, and 1N show example configurations of playback devices in zones and zone groups. Referring first to FIG. 1N, in one example, a single playback device may belong to a zone. For example, the playback device 110*g* in the Second Bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*m* (e.g., a right playback device) to form Zone B. Bonded playback devices may have different playback responsibilities (e.g., channel responsibilities), as will be described in more detail further below. In other implementations, multiple playback devices may be merged to form a single zone. As one example, the playback device 110*a* can be bonded to the playback device 110*n* and the NMD 120*c* to form Zone A. As another example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In yet other implementations, one or more playback zones can be merged to form a zone group (which may also be referred to herein as a merged group). As one example, the playback zones Zone A and Zone B can be merged to form Zone Group 108*a*. As another example, the playback zones Zone G and Zone H can be merged to form Zone Group 108*b*. The merged playback zones Zone G and Zone H may not be specifically assigned different playback responsibilities. That is, the merged playback zones Zone G and Zone H may, aside from playing media content in synchrony, each play media content as they would if they were not merged and operating as independent zones.

Each zone in the MPS 100 may be represented for control as a single user interface (UI) entity. For example, Zone A may be represented as a single entity named Master Bathroom. Zone B may be represented as a single entity named Master Bedroom. Zone C may be represented as a single entity named Second Bedroom.

In some implementations, as mentioned above playback devices that are bonded may have different playback responsibilities, such as responsibilities for certain audio channels. For example, as shown in FIG. 1J, the playback devices 110*l* and 110*m* may be bonded so as to produce or enhance a stereo effect of media content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1K, the playback device 110*h* named Front may be bonded with the playback device 110*i* named SUB. The Front device 110*h* can be configured to render a range of mid to high frequencies and the SUB playback device 110*i* can be configured to render low frequencies. When unbonded, however, the Front device 110*h* can be configured to render a full range of frequencies. As another example, FIG. 1L shows the Front and SUB playback devices 110*h* and 110*i* further bonded with Left and Right playback devices 110*j* and 110*k*, respectively. In some implementations, the Right and Left devices 110*j* and 110*k* can be configured to form surround or "satellite" channels of a home theater system. The bonded playback devices 110*h*, 110*i*, 110*j*, and 110*k* may form a single Zone D (FIG. 1N).

In other implementations, playback devices that are merged may not have assigned playback responsibilities and may each render the full range of media content of which the respective playback device is capable. Nevertheless, merged devices may be represented as a single UI entity (i.e., a zone, as discussed above). For instance, the playback devices 110*a* and 110*n* in the Master Bathroom have the single UI entity of Zone A. In one embodiment, the playback devices 110*a* and 110*n* may each output the full range of media content of which each respective playback devices 110*a* and 110*n* is capable, in synchrony.

In some embodiments, an NMD may be bonded or merged with one or more other devices so as to form a zone. As one example, the NMD 120*c* may be merged with the playback devices 110*a* and 110*n* to form Zone A. As another example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. Pat. No. 10,499,146.

As mentioned above, in some implementations, zones of individual, bonded, and/or merged devices may be grouped to form a zone group. For example, referring to FIG. 1N, Zone A may be grouped with Zone B to form a zone group 108*a* that includes the two zones, and Zone G may be grouped with Zone H to form the zone group 108*b*. However, other zone groupings are also possible. For example, Zone A may be grouped with one or more other Zones C-I. The Zones A-I may be grouped and ungrouped in numerous ways. For example, three, four, five, or more (e.g., all) of the Zones A-I may be grouped at any given time. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back media content.

In various implementations, the zone groups in an environment may be named by according to a name of a zone within the group or a combination of the names of the zones within a zone group. For example, Zone Group 108*b* can be assigned a name such as "Dining+Kitchen", as shown in FIG. 1N. In other implementations, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the Second Bedroom 101*c* may indicate (i) that the playback device 110*g* is the only playback device of the Zone C and (ii) that Zone C is not in a zone group. Identifiers associated with the Den 101*d* may indicate that the Den 101*d* is not grouped with other zones but includes bonded playback devices 110*h*-110*k*. Identifiers associated with the Dining Room 101*g* may indicate that the Dining Room 101*g* is part of the Dining+Kitchen Zone Group 108*b* and that devices 110*d* and 110*b* (Kitchen 101*h*) are grouped (FIGS. 1M, 1N). Identifiers associated with the Kitchen 101*h* may indicate the same or similar information by virtue of the Kitchen 101*h* being part of the Dining+Kitchen Zone Group 108*b*. Other example zone variables and identifiers are described below.

In yet another example, the MPS 100 may include variables or identifiers representing other associations of zones and zone groups, such as identifiers associated with Areas, as shown in FIG. 1N. An area may involve a cluster of zone groups and/or zones not within a zone group. For instance, FIG. 1N shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Pat. No. 10,712,997 filed Aug. 21, 2017, issued Jul. 14, 2020, and titled "Room Association Based on Name," and U.S. Pat. No. 8,483,853, filed Sep. 11, 2007, issued Jul. 9, 2013, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
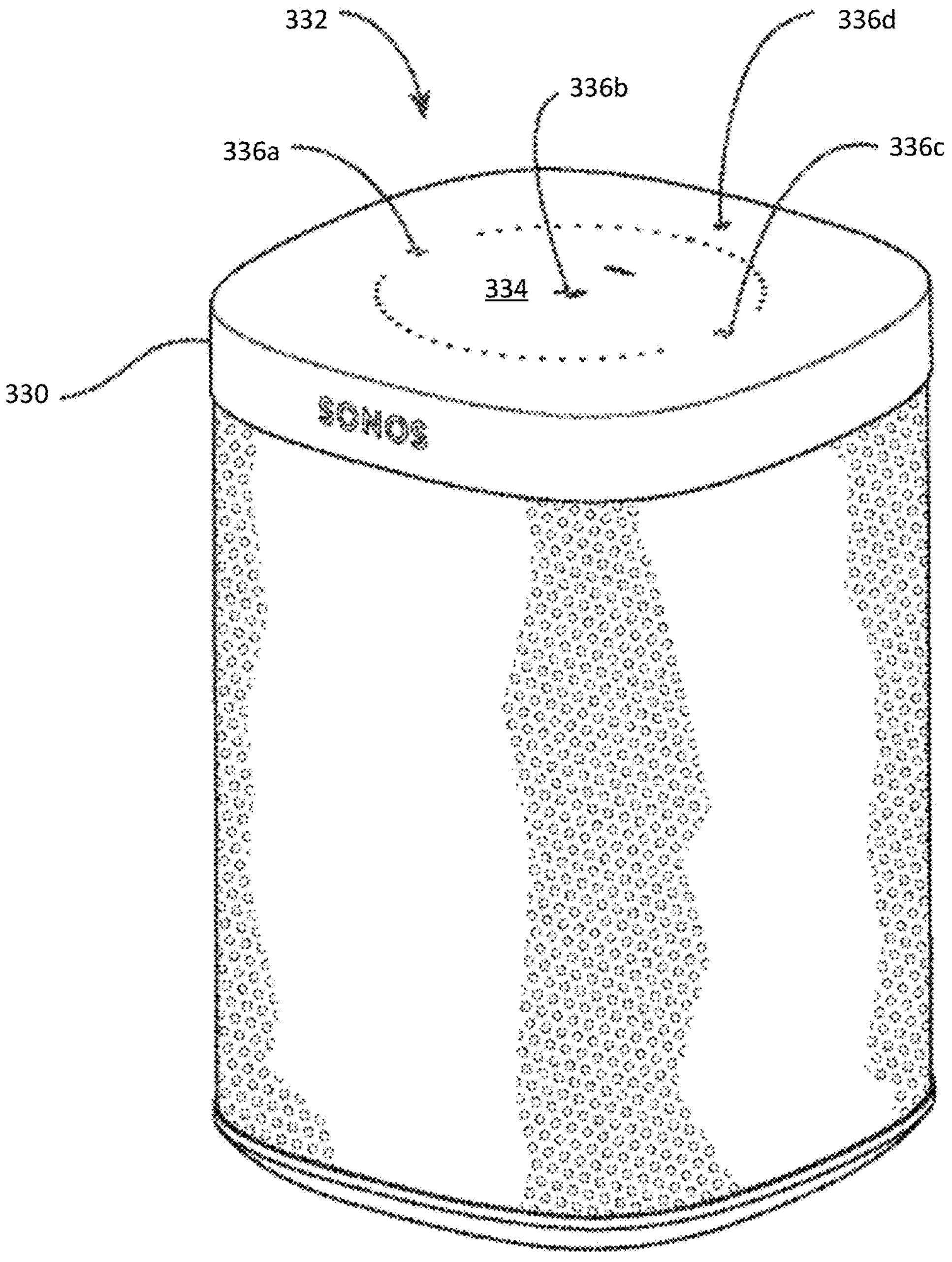
FIG. 3 is an isometric diagram of an example playback device housing.

FIG. 3 shows an example housing 330 of a playback device (e.g., one of the playback devices 110 discussed above) that includes a user interface in the form of a control area 332 at a top portion 334 of the housing 330. The control area 332 includes buttons 336*a*, 336*b*, and 336*c* for controlling audio playback, volume level, and other functions. The control area 332 also includes a button 336*d* for toggling one or more microphones (not visible in FIG. 3) of the playback device 110 to either an on state or an off state. The control area 332 is at least partially surrounded by apertures formed in the top portion 334 of the housing 330 through which the microphones receive the sound in the environment of the playback device. The microphones may be arranged in various positions along and/or within the top portion 334 or other areas of the housing 330 so as to detect sound from one or more directions relative to the playback device.

f. Media Content

Media content may be any type of media content now known or later developed. For example, in some embodiments, the media content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other control device now known or later developed; (iii) media content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) media content from a doorbell or intercom system such as Nest, Ring, or other doorbells or intercom systems now known or later developed; and/or (vi) media content from a telephone, video phone, video/teleconferencing system or other application configured to allow users to communicate with each other via audio and/or video.

Media content that can be played by a playback device as described herein, including any of the aforementioned types of media content, may also be referred to herein as media content. A source from which the media content is obtained may be referred to herein as a media content source.

In operation, a "sourcing" playback device obtains any of the aforementioned types of media content from an audio source via an interface on the playback device, e.g., one of the sourcing playback device's network interfaces, a "line-in" analog interface, a digital audio interface, or any other interface suitable for receiving media content in digital or analog format now known or later developed.

An audio source is any system, device, or application that generates, provides, or otherwise makes available any of the aforementioned media content to a playback device. For example, in some embodiments, an audio source includes any one or more of a streaming media (audio, video) service, digital media server or other computing system, VAS service, television, cable set-top-box, streaming media player (e.g., AppleTV, Roku, gaming console), CD/DVD player, doorbell, intercom, telephone, tablet, or any other source of digital media content.

A playback device that receives or otherwise obtains media content from an audio source for playback and/or distribution to other playback devices may be referred to herein as the "sourcing" playback device, "master" playback device, or "group coordinator." One function of the "sourcing" playback device is to process received media content for playback and/or distribution to other playback devices. In some embodiments, the sourcing playback device transmits the processed media content to all the playback devices that are configured to play the media content. In some embodiments, the sourcing playback device transmits the processed media content to a multicast network address, and all the other playback devices configured to play the media content receive the media content via that multicast address. In some embodiments, the sourcing playback device alternatively transmits the processed media content to each unicast network address of each other playback device configured to play the media content, and each of the other playback devices configured to play the media content receive the media content via its unicast address.

III. Example Operations of Classic Mode and Compact Mode of MPS Controller Application As discussed above, a control device may be configured to operate in either a classic mode of a media playback system (MPS) controller application or a compact mode of the MPS controller application. While operating in the classic mode of the MPS controller application, the control device may provide a comprehensive set of features for a user of the control device to customize her listening experience with a high degree of granularity. As previously described, the comprehensive set of features provided by the control device while operating in the classic mode of the MPS controller application may enable a user of the control device to (i) search for and discover media content, (ii) organize media content into playlists or the like, (iii) cause media content to be played back by one or more playback devices of a media playback system, (iv) group and ungroup playback devices for synchronous playback of media content, and (v) control various settings and configurations of the media playback system (e.g., associated media sources, playback settings, playback device calibration, pre-defined device groups, alarms, etc.), among various other things.

In contrast, while operating in the compact mode of the MPS controller application, the control device may provide an on-demand control experience that is contextualized to unique scenarios or contexts that the user of the control device may be in. The control device may accomplish this by, among other things, determining a context during which the control device receives a request to operate in the compact mode of the MPS controller application, and, based on the determined context, provide a contextualized subset of features for the user of the control device to customize her listening experience. The various operations that the control device may be configured to perform in both modes of the MPS controller application (i.e., the classic mode and the compact mode) are described in greater detail below.

Figure 4:
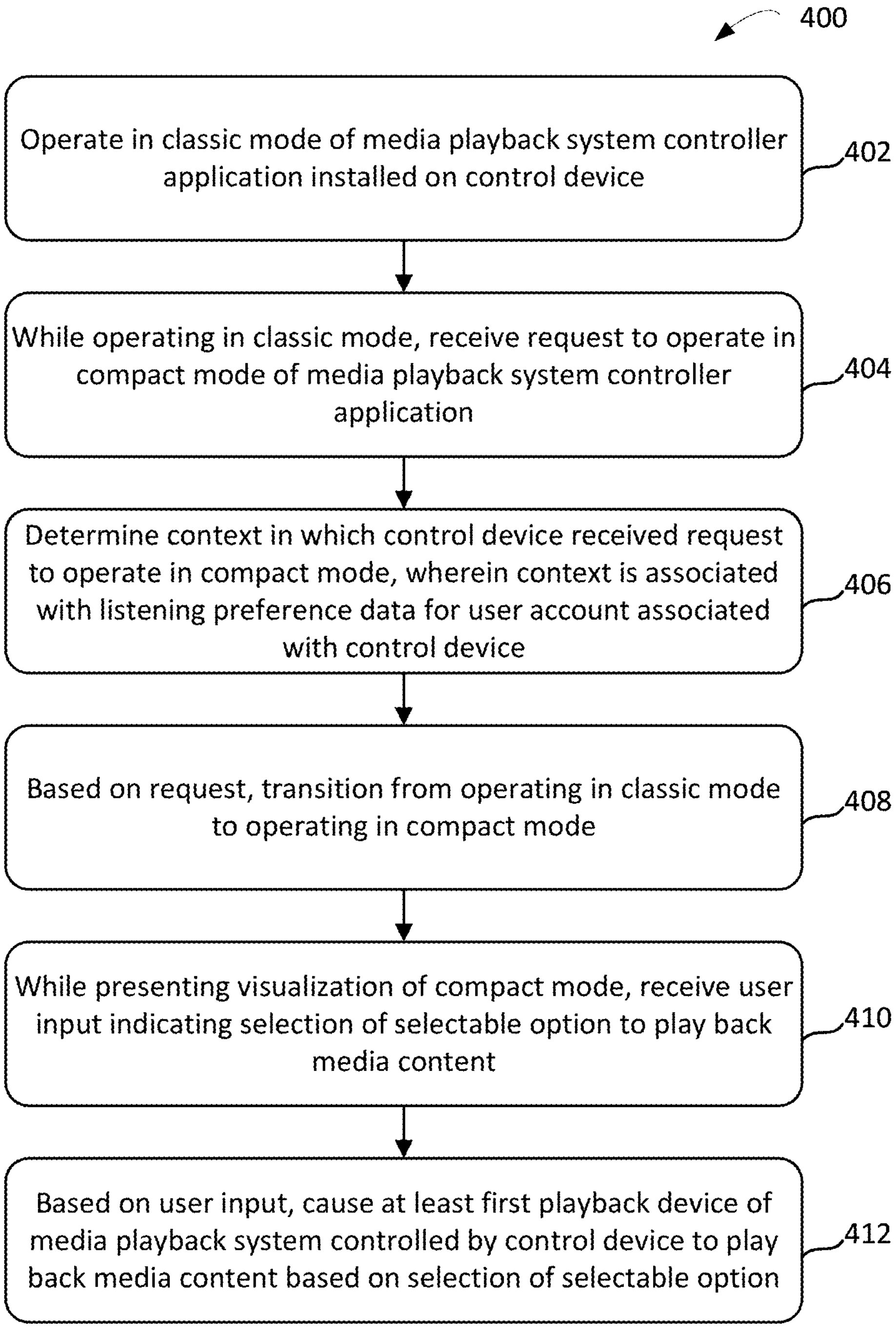
FIG. 4 is a flowchart that illustrates operations that may be carried out by a control device to provide a contextualized on-demand control experience to a user, according to the present disclosure.

Turning now to FIG. 4, a flowchart 400 is shown illustrating various operations that may be carried out by a control device to provide a contextualized on-demand control experience to a user of the control device, according to the present disclosure. The control device may be, for example, any of the control devices 130 discussed above and shown in FIGS. 1A-3, such as the control device 130*a*.

Beginning at block 402, the control device 130 may operate in the classic mode of the MPS controller application installed on the control device 130. In some implementations, the control device 130 may operate in the classic mode of the MPS controller application by default. For example, a user of the control device 130 may configure the control device 130 to default to operating in the classic mode of the MPS controller application upon initiation of a runtime session of the MPS controller application. Various other possibilities exist.

While operating in the classic mode of the MPS controller application, the control device 130 may be configured to provide a set of options for controlling a MPS that, collectively, enable a user of the control device 130 to customize her listening experience with a high degree of granularity. As previously described, the set of options for controlling the MPS may enable the user of the control device 130 to perform any of various operations, such as (i) searching for and discovering media content, (ii) organizing media content into playlists or the like, (iii) causing media content to be played back by one or more playback devices of a media playback system, (iv) grouping and ungrouping playback devices for synchronous playback of media content, and (v) controlling various settings and configurations of the media playback system (e.g., associated media sources, playback settings, playback device calibration, pre-defined device groups, alarms, etc.), among various other things.

Figure 5:
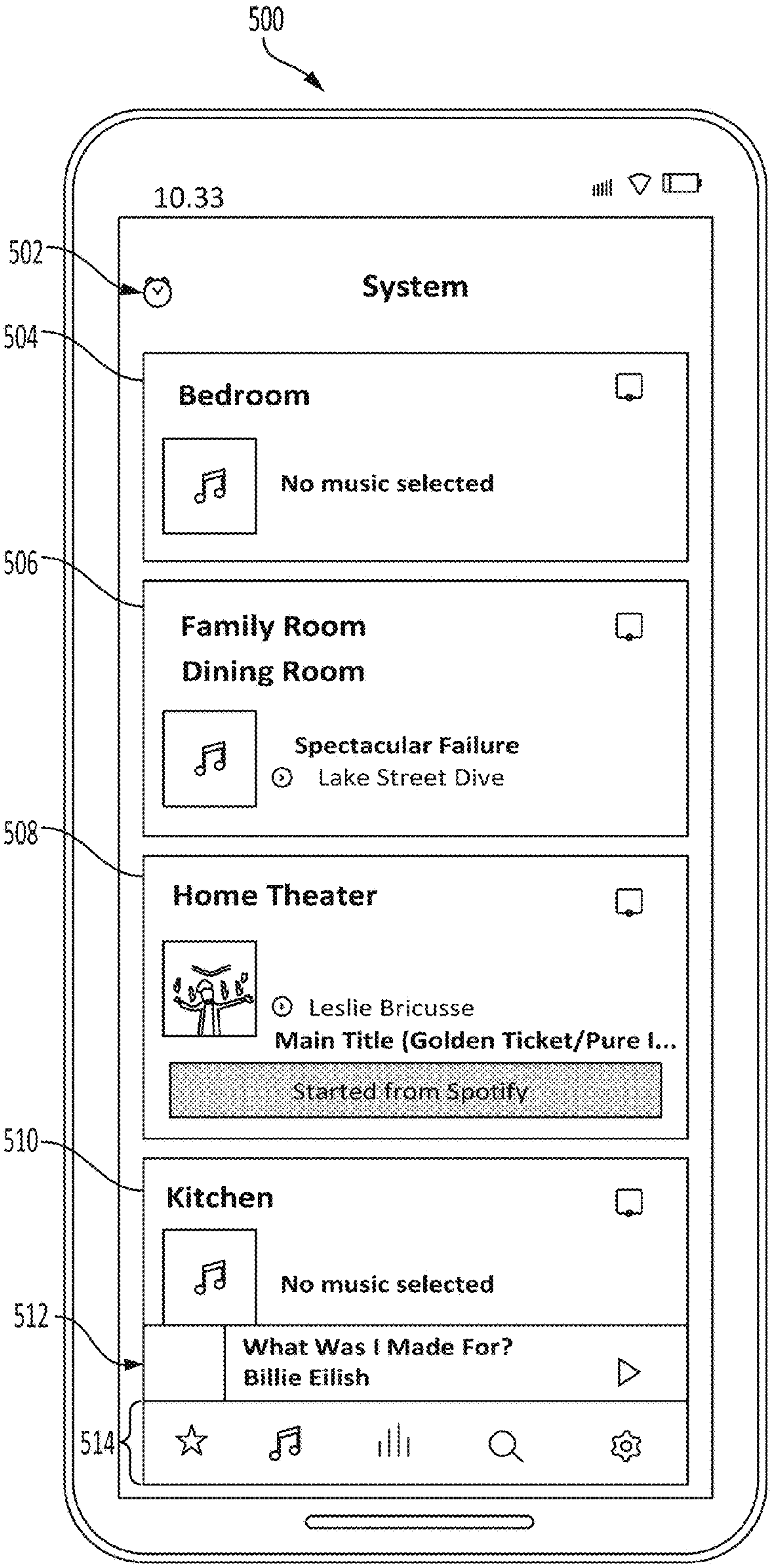
FIG. 5 is a block diagram of the control device of FIG. 4 operating in a classic mode of a media playback system controller application, according to the present disclosure.

FIG. 5 illustrates an example visualization 500 that may be presented via the control device 130 while operating in the classic mode of the MPS controller application. The example visualization 500 may include a number of selectable icons that corresponds to the set of options provided by the control device 130 for controlling the MPS.

As shown, the example visualization 500 includes an alarm selectable icon 502 for alarms that may be provided as part of the classic mode of the MPS controller application. The alarm selectable icon 502 may enable a user to set up and manage alarms for playback devices of the MPS to automatically play back certain media content at a specified time. For example, upon selection of the alarm selectable icon 502, the control device 130 may present an alarm settings menu to add new alarms, edit details of existing alarms, and/or delete existing alarms. Details for alarms that a user may manage include things such as (i) what media service to retrieve media content from for playback, (ii) what days/times to play back media content, (iii) what playback device(s) of the MPS are to play back media content, and (iv) playback settings, such as volume settings, for playback of the media content, among various other details.

The example visualization 500 may also include a number of selectable icons, each for a given zone, zone group, or other grouping of playback devices in the MPS. As shown, the example visualization 500 includes (i) a bedroom selectable icon 504 for one or more playback devices of the MPS that are grouped in a bedroom zone of the MPS, (ii) a family room and dining room selectable icon 506 for a zone group comprising (a) one or more playback devices of the MPS that are grouped in a family room zone of the MPS and (b)

one or more playback devices of the MPS that are grouped in a bedroom zone of the MPS, (iii) a home theater selectable icon 508 for one or more playback devices of the MPS that are grouped in a home theater zone of the MPS, and (iv) a kitchen selectable icon 510 for one or more playback devices of the MPS that are grouped in a kitchen zone of the MPS.

Further, each of the selectable icons 504-510 may include (i) a respective grouping selectable icon that enables a user of the control device 130 to perform grouping/ungrouping commands for playback devices that may be grouped in a given zone or zone group or the like of the selectable icon, (ii) a respective media content art icon that may present an image associated with media content played back by one or more playback devices associated with the selectable icon, such as album art for media content comprising an album played back by one or more playback devices associated with the selectable icon, and (iii) a respective "Now Playing" or "Queue Information" selectable icon that may identify media content that is playing back and/or populated in a playback queue of the one or more playback devices associated with the selectable icon.

In some implementations, there may be more or fewer selectable icons such as the selectable icons 504-510, depending on the number of zones or zone groups in the MPS. For example, when there are more selectable icons such as the selectable icons 504-510 than can fit on the example visualization 500, a user may "scroll" through the selectable icons to identify a desired selectable icon.

The example visualization 500 also includes a playback control selectable icon 512 that enables a user of the control device 130 to control playback of media content for one or more selected playback devices of the MPS. For example, if a user has selected one of the selectable icons 504-510, then the control selectable icon 512 may enable a user of the control device 130 to control playback of media content for one or more playback devices that are associated with the selected one of the selectable icons 504-510.

Further, the example visualization 500 includes a menu 514 that facilitates various additional functionality supported by the control device 130 when operating in the classic mode of the MPS controller application. Accordingly, the menu 514 may include a number of selectable icons that each facilitates a given functionality supported by the control device 130 when operating in the classic mode of the MPS controller application. A first selectable icon of the menu 514 may be a "My Sonos" selectable icon that, when selected, causes a "My Sonos" visualization to be presented via the control device 130. The "My Sonos" visualization may present a highly customizable and personalized collection of media content (e.g., favorites, "liked" songs, saved playlists, etc.) for the user of the control device 130.

A second selectable icon of the menu 514 may be a "Browse" selectable icon that, when selected, causes a "Browse" visualization to be presented via the control device 130. The "Browse" visualization may present a number of media services that may be associated with a user account of a user of the control device 130, such as Spotify, Audible, Pandora, Sonos Radio HD, among various other possible media services that may be associated with a user account of a user of the control device 130. Selection of a given media service presented via the "Browse" visualization may cause a plugin or the like of the given media service to be presented within the classic mode of the MPS controller application, which may be tailored to a user account of the user of the control device 130 for the given media service. The user of the control device 130 may then navigate the plugin or the like of the given media service to select media content to be played back by playback devices of the MPS.

A third selectable icon of the menu 514 may be a "System" selectable icon, which may cause the example visualization 500 to be presented via the control device 130.

A fourth selectable icon of the menu 514 may be a "Search" selectable icon, which may enable a user of the control device 130 to search for certain media content across the user's available media content sources.

A fifth selectable icon of the menu 514 may be a "Settings" selectable icon, which may, upon selection, cause a settings visualization to be presented via the control device 130. Within the settings visualization, the user of the control device 130 may be enabled to adjust various settings of the MPS controller application, such as (i) which user account is signed in to the MPS controller application, (ii) what system settings the MPS controller application is configured with for the user account, (iii) which music services are linked with the user account, and (iv) which voice assistants are linked with the user account, among various other possible settings.

The example visualization 500 may include various other selectable icons, and may facilitate various other operations that the control device 130 may perform while operating in the classic mode of the MPS controller application. As may be appreciated, the classic mode of the MPS controller application provides a comprehensive and highly personalized set of features for users to customize their listening experience with a high degree of granularity. However, the large quantity of features that the classic mode of the MPS controller application offers can be overwhelming, as previously described. Accordingly, a user of the control device 130 may desire to transition the control device 130 from operating in the classic mode of the MPS controller application to operating in the compact mode of the MPS controller application.

Returning to FIG. 4, at block 404, the control device 130 may, while operating in the classic mode of the MPS controller application, receive a request to operate in the compact mode of the MPS controller application, for example, transmitted by a user of the control device 130 that may desire for the control device 130 to transition from operating in the classic mode of the MPS controller application to operating in the compact mode of the MPS controller application.

In practice, the request to operate in the compact mode of the MPS controller application may take any of various forms. As one possibility, the request may take the form of an orientation of the control device 130 being adjusted while the control device 130 is operating in the classic mode of the MPS controller application. To illustrate with an example, a user operating the control device 130 (which in this example may take the form of a smartphone) may initiate a runtime session of the MPS controller application, which, as previously described, may result in the control device 130 defaulting to the classic mode of the MPS controller application. After a period of time, the user may desire to transition the control device 130 from operating in the classic mode of the MPS controller application to operating in the compact mode of the MPS controller application. Accordingly, the user may "flip" the control device 130 from a first (e.g., vertical) orientation to a second (e.g., horizontal) orientation. In such an example (as well as in other implementations), the control device 130 may comprise accelerometers and gyroscopes and the like that may enable the control device 130 to determine that an orientation of the control device 130 has been adjusted, which the control device 130 may interpret as the received request to operate in the compact mode of the MPS controller application.

As may be appreciated, the control device 130 may be configured in various ways to determine what orientation adjustments amount to a request to operate in the compact mode of the MPS controller application. As one option, the control device 130 may be configured to determine whether the orientation of the control device 130 has adjusted a threshold amount to determine whether the orientation adjustment amounts to a request to operate in the compact mode of the MPS controller application. An example threshold amount of orientation adjustment may be an orientation adjustment of 80-100 degrees, although any amount of orientation adjustment may be possible threshold amounts of orientation adjustment.

As another option, the control device 130 may be configured to determine whether the orientation of the control device 130 is within a threshold proximity to a target orientation. For instance, a target orientation may be a range of 80-100 degrees, among various other possible target ranges, and if the control device 130 determines that its orientation has adjusted to an orientation within the threshold proximity to the target orientation, then the control device 130 may determine that the orientation adjustment amounts to a request to operate in the compact mode of the MPS controller application.

The control device 130 may be configured to determine what orientation adjustments amount to a request to operate in the compact mode of the MPS controller application. Further, the control device 130 may also consider factors such as a period of time that the control device 130 has been stationary in the adjusted orientation, among other possibilities, to determine what orientation adjustments amount to a request to operate in the compact mode of the MPS controller application.

As another possibility, the request may take the form of a button of the control device 130 being pressed. As one option, the control device 130 may be configured, for example, by a user of the control device 130, to interpret presses of a given button of the control device 130 as requests to operate in the compact mode of the MPS controller application. As another option, the control device 130 may include a button that is a dedicated (e.g., hard-coded) receiver of requests to operate in the compact mode of the MPS controller application. In such instances, the control device 130 may interpret presses of the button as requests to operate in the compact mode of the MPS controller application. Further, there may be various inputs (i.e., button presses) that the control device 130 may interpret as requests to operate in the compact mode of the MPS controller application. Such inputs may include (i) a single button press, (ii) multiple button presses (e.g., a double tap, a triple tap, etc.), and (iii) a long button press, among various other possibilities.

As still another possibility, the request may take the form of a user input received by a playback device, such as a user pressing and holding a "play" button or the like. For example, the playback device may, upon receiving such user input, (i) initiate a particular pre-set routine (e.g., playing back certain media content), and (ii) transmit an indication of the received user input to the control device 130, among various other things. The control device 130 may then, based on (i) detecting the particular pre-set routine initiated by the playback device and/or (ii) receiving the indication of the received user input from the playback device, operate in the compact mode of the MPS controller application.

As yet another possibility, the request may take the form of a selectable icon presented via a visualization of the MPS controller application being selected. For example, in addition to the various selectable icons shown with respect to FIG. 5, a visualization presented via the control device 130 while operating in the classic mode of the MPS controller application may also include an additional selectable icon, the selection of which may be interpreted by the control device 130 as a request for the control device 130 to operate in the compact mode of the MPS controller application. A user of the control device 130 may select the additional selectable icon in various ways, such as via (i) a single press of the additional selectable icon, (ii) multiple presses of the additional selectable icon (e.g., a double tap, a triple tap, etc.), and (iii) a long press of the additional selectable icon, among various other possibilities. Other related user inputs that the control device 130 may interpret as a request to operate in the compact mode of the MPS controller application may include (i) swiping a display of the control device 130 in a particular manner (e.g., a patterned swipe) and (ii) entering a PIN, among various other options.

As yet still another possibility, the request may take the form of a voice command, which may be uttered by the user of the control device 130. Example voice commands may include a wakeword identifying a voice assistant service followed by a command phrase identifying the request. For example, a wakeword that may be uttered by the user of the control device 130 may be "Hey Sonos" and the command may be "switch to the compact mode." In some implementations, the control device 130 may receive the voice command and thereby identify the request. Additionally, in some implementations, a playback device of the MPS may receive the voice command and transmit and indication to the control device 130 of the voice command. Various other possibilities may also exist.

As yet another possibility, the request may take the form of the control device 130 being shaken or moved in a particular manner. In such implementations, among others, the control device 130 may include accelerometers, gyroscopes, or the like, that may detect movements of the control device 130. Accordingly, the control device 130 may utilize the accelerometers, gyroscopes, or the like to determine whether the control device has been shaken or moved in particular manner, to determine whether a request has been received. Further, the control device 130 may be configured to determine various factors, such as an extent of the shaking and/or movement of the control device 130 to determine whether the shaking and/or movement amounts to a request to operate in the compact mode of the MPS controller application. For example, if the control device 130 determines that it has been shaken/moved a threshold amount, then the control device 130 may interpret the shaking/movement of the control device 130 as a request to operate in the compact mode of the MPS controller application.

As yet still another possibility, the request may take the form of the control device 130 being plugged into a power source/docking station. For example, the control device 130 may be configured to interpret being plugged into a power source, docking device, or the like as a request to operate in the compact mode of the MPS controller application. As another example, the control device 130 may be configured to interpret being unplugged from a power source, docking station, or the like as the request to operate in the compact mode of the MPS controller application.

Further, in some implementations, the control device 130 may determine a request using one or more sensors to detect user behavior (e.g., a gesture) that is intended to indicate a request. Such sensors may include millimeter wave (mmWave) radar sensors, ultra-wideband (UWB) sensors, passive infrared (PIR) sensors, infrared (IR) camera sensors, stereo cameras. and the like. Such sensors may be integral components of the control device 130 or may be external to the control device 130. Further, the user behavior may take any of various forms, and the control device 130 may be configured to recognize certain user behaviors as being indicating a request to operate in the compact mode of the MPS controller application. The request to operate in the compact mode of the MPS controller application may take various other forms.

Further yet, although block 404 describes a request for the control device 130 to operate in the compact mode of the MPS controller application e.g., from operating in the classic mode of the MPS controller application, in some implementations, the control 130 may receive requests to operate in the classic mode of the MPS controller application, for example, when a user of the control device 130 desires to have access to the more comprehensive set of features available via the classic mode of the MPS controller application. In such implementations, the request for the control device 130 to operate in the classic mode of the MPS controller application may take any of the various forms described above.

In implementations where the control device 130 transitions from a first mode of the MPS controller application to a second mode of the MPS controller application, and then back again to the first mode, the control device 130 may be configured to resume the state of the first mode upon returning to the first mode. To accomplish this, the control device 130 may be configured to store, e.g., in memory, a state of a first mode of the MPS controller application that the control device 130 is operating in accordance to when a request to transition from operating in the first mode of the MPS controller application to operating in a second mode of the MPS controller application. The control device 130 may then, when returning to operating in the first mode of the MPS controller application, retrieve the state of the first mode of the MPS controller application that was stored, e.g., in memory, so as to return to the stored state of the first mode of the MPS controller application. As may be appreciated, this may apply both to (i) returning to operating in the classic mode of the MPS controller application from operating in the compact mode of the MPS controller application, as well as to (ii) returning to operating in the compact mode of the MPS controller application from operating in the classic mode of the MPS controller application.

At block 406, the control device 130 may determine a context in which the control device 130 received the request to operate in the compact mode of the MPS controller application. As may be appreciated, the control device 130 may determine the context based on any of various factors.

One factor that the control device 130 may consider when determining the context may be listening preference data for a user account associated with the control device 130. The listening preference data may take the form of metadata of interactions between a user having a user account associated with the control device 130 and the control device 130, such as (i) what times the user interacts with the control device 130, (ii) what media items are played back by playback devices of the MPS, and (iii) what locations where the user interacts with the control device 130, among various other possibilities.

Optionally, the listening preference data may be listening preference data for the control device 130, regardless of any user account associated with the control device 130. For example, the listening preference data may take the form of metadata of audio content played back by playback devices of the MPS, regardless of which user account interacted with the control device 130 to cause playback of the audio content.

Another factor that the control device 130 may consider when determining the context may be a location of the control device 130, which the control device 130 may determine in various ways. As one possibility, the control device 130 may determine the location of the control device 130 based on a wireless signal strength (e.g., Wifi or Bluetooth) to playback devices in the MPS. As another possibility, the control device 130 may determine the location of the control device 130 based on detection of audio signals from playback devices in the MPS. For example, the control device 130 may compare features of the audio signal received by the control device 130 (e.g., a perceived volume of the audio signal originating from one or more playback devices in the MPS) with features of the audio signal as transmitted by the one or more playback devices to determine a distance between the one or more playback devices and the control device 130. The control device 130 may then determine the location of the control device 130 based on a known location of the one or more playback device and the determined distance between the one or more playback devices in the MPS. Further, the audio signals may either be audible (e.g., a chirp or media content played back by the one or more playback devices) or inaudible (e.g., outside of a frequency range that is perceivable to humans).

As yet another possibility, the control device 130 may determine the location of the control device 130 based on an active zone of the control device 130. The active zone of the control device 130 may be a zone corresponding to current user interactions with the MPS controller application. Example user interactions for a zone may include (i) controlling playback of one or more playback devices of the zone and (ii) browsing media content for the zone, among various other examples. To illustrate with an example, a user of the control device 130 may browse the MPS controller application for content to be played back by one or more playback devices in an “office” zone. Based on the user’s browsing, the control device 130 may determine that the location is the “office.” Various other examples may also exist.

After determining the location of the control device 130, the control device 130 may then compare the determined location of the control device 130 with (i) known locations of playback devices in the MPS, (ii) a known map of a region of the MPS, or the like to determine additional location information for the control device 130. For example, if the control device 130 determines that it is proximate to a playback device that is located in a bedroom, then the control device 130 may determine that it is located in the bedroom as well. As may be appreciated, various other possibilities may also exist.

Yet another factor that the control device 130 may consider when determining the context may be a time that the control device 130 received the request to operate in the compact mode of the MPS controller application. As one example, the time may be a general time of day, such as morning, afternoon, evening, etc. As another example, the time may be a numerical time, such as 7 am, 1 pm, 6 pm, etc. In some examples, the control device may determine the general time of day based on the numerical time of day that the request was received. Yet still another factor that the control device 130 may consider when determining the context may be a setting of the control device 130, which may be defined by a user of the device 130 and then applied to the control device 130. One possible setting that a user of the control device 130 may apply to the control device 130 may cause the control device 130 to determine a given context when certain requests are received. For example, a user may apply a setting so that requests received between 6 am to 7 am cause the control device 130 to determine a "morning routine" context. As another example, a user may apply a setting so that any requests comprising shaking the control device 130 cause the control device 130 to determine an "exercise routine" context. Various other examples of this setting may also exist.

Another possible setting that a user of the control device 130 may apply to the control device 130 may define a universe of contexts that the control device 130 may determine when requests are received. The user of the control device 130 may define the universe of contexts in various ways, such as by selecting contexts from a list of possible contexts, defining new contexts, etc. Various other possible settings may exist.

Yet still another factor that the control device 130 may consider when determining the context may be media content that is currently playing back by playback devices of the MPS. For example, if one or more playback devices in the bedroom are playing relaxing music, then the control device 130 may determine a context that is at least partially based on the relaxing music that is being played back (e.g., a bedtime routine context, a meditation routine context, etc.).

Further, in practice, the determined context may take various forms. As one possibility, the determined context may be a specific routine of the user of the control device 130. There may be various routines that the user of the control device 130 may practice, some examples including a morning routine, a work routine, an evening routine, and a bedtime routine, among various other routines. As another possibility, the determined context may be a specific mood, ambiance, or the like. As yet another possibility, the determined context may be an inferred activity that the user of the control device might be engaging in. Examples of inferred activity may include cooking, exercising, sleeping, working, meditating, etc. In practice, there may be various other contexts that the control device 130 may determine.

To illustrate how the control device 130 may determine a given context using the factors described above, consider the following example. A user of the control device 130 may enter his bedroom at 9 pm and may have a preference for listening to jazz music to help him sleep. As the user enters his bedroom, he places the control device 130 (e.g., a smartphone), which may currently be operating in the classic mode of the MPS controller application, in a horizontal orientation and plugs in a charger. The control device 130 may interpret these actions as a request to operate in the compact mode of the MPS controller application. Accordingly, the control device 130 may consider various factors to determine the context when the request was received. In this scenario, the factors may include (i) the time of day (i.e., 9 pm), (ii) the location of the control device 130 (i.e., in the bedroom), (iii) listening preference data for a user account of the user (e.g., metadata indicating that the user has a preference for listening to jazz music to help him sleep, and that jazz music is regularly played by playback devices in the bedroom around 9 pm), and (iv) jazz music that one or more playback device 130 in the bedroom may currently be playing back. Based on these factors, the control device 130 may determine that the context when the request was received is a bedtime routine.

As described in greater detail below, each of the various contexts mentioned may correspond to how the compact mode of the MPS controller application is presented via the control device 130. For example, which selectable icons are presented on a visualization of the compact mode of the MPS controller application may be determined based on the context determined by the control device 130.

At block 408, the control device 130 may, based on the request received at block 404, transition from operating in the classic mode of the MPS controller application to operating in the compact mode of the MPS controller application.

In transitioning from operating in the classic mode of the MPS controller application to operating in the compact mode of the MPS controller application, the control device 130 may cease performing certain operations that the control device 130 was configured to perform while operating in the classic mode of the MPS controller application. For example, the control device 130 may stop presenting a visualization of the classic mode of the MPS controller application, such as the example visualization 500 of FIG. 5. Along with ceasing the presentation of the visualization of the classic mode of the MPS controller application, the control device 130 may also cease providing certain options of the set of options for controlling the MPS that the control device 130 was configured to provide while operating in the classic mode of the MPS controller application. Various other possibilities may also exist.

Further, in transitioning from operating in the classic mode of the MPS controller application to operating in the compact mode of the MPS controller application, the control device 130 may begin to perform certain operations that the control device 130 is configured to perform while operating in the compact mode of the MPS controller application. As previously described, one example operation that the control device 130 may be configured to perform while operating in the compact mode of the MPS controller application may be to provide a subset of options of the set of options for controlling the MPS. The subset of options may be contextualized based on the determined context for the user of the control device to customize her listening experience.

In practice, there may be various differences between the subset of options that the control device 130 may provide for controlling the MPS while operating in the compact mode of the MPS controller application and the set of options that the control device 130 may provide for controlling the MPS while operating in the classic mode of the MPS controller application. As one possibility, the extent of features that the control device 130 may be configured to perform while operating in the compact mode of the MPS controller application may be reduced in some aspects as compared to the extent of features that the control device 130 may be configured to perform while operating in the classic mode of the MPS controller application.

One aspect in which the extent of features that the control device 130 may be configured to perform while operating in the compact mode of the MPS controller application may be reduced as compared to the extent of features that the control device 130 may be configured to perform while operating in the classic mode of the MPS controller application may be the extent of media discovery that may be supported by the control device 130. For example, in the classic mode of the MPS controller application, the control device 130 may provide various options of the set of options that may enable the user to discover media content. By contrast, while operating in the compact mode of the MPS controller application, the control device 130 may only be configured to enable discovery of certain genres of media content, such as based on the context determined by the control device at block 406.

Another aspect may be a level of interactability of the user of the control device 130 with playback devices of the MPS. For example, while the control device 130 is operating in the classic mode of the MPS controller application, the user of the computing device 130 may have various means of interacting with playback devices of the MPS, such as by (i) selecting respective grouping configurations for various playback devices of the MPS, (ii) selecting respective volume settings for various playback devices of the MPS, (iii) selecting EQ settings for various playback devices of the MPS, (iv) selecting respective calibration settings for various playback devices of the MPS, and (v) adding new playback devices to the MPS, among various other possibilities, such as those described with respect to FIG. 5. In contrast, the user of the computing device 130 may have fewer means of interacting with the playback devices of the MPS when the control device 130 is operating in the compact mode of the MPS controller application. For instance, the user of the computing device 130 may only be able to interact with a subset of playback devices of the MPS, and the subset may be determined by the control device 130 based on the context determined by the control device 130 at block 406. For example, if the control device 130 has determined that the context is a bedtime routine, then the user may only be able to interact with playback devices that are located in the bedroom.

Further, the extent to which the user of the control device 130 may interact with the subset of playback devices may be reduced as well. For example, the user of the control device 130 may be able to (i) select from a limited extent of grouping configurations for the subset of playback devices, (ii) control a volume at which the subset of playback devices are configured to play back media content generally, but perhaps without access to EQ settings of the subset of playback devices, and (iii) control playback of media content played back by the subset of playback devices, such as by pausing media content, resuming media content, rewinding media content, fast forwarding media content, skipping media content, and restarting media content, but without having control of playback of media content played back by playback devices other than the subset of playback devices. Various other possibilities may also exist.

Yet another aspect may be an interactability of the user of the control device 130 with third party software services with the MPS, such as music services and voice assistant software services. For example, while the control device 130 is operating in the classic mode of the MPS controller application, a user of the control device 130 may have the ability to add new music services and voice assistant software services, as well as to edit various settings regarding said music services and voice assistant software services. In contrast, while the control device 130 is operating in the compact mode of the MPS controller application, a user of the control device 130 may only have the ability to utilize music services and voice assistant software services that are already associated with the MPS controller application.

In practice, there may be various other aspects in which the extent of features that the control device 130 may be configured to perform while operating in the compact mode of the MPS controller application may be reduced as compared to the extent of features that the control device 130 may be configured to perform while operating in the classic mode of the MPS controller application.

As another possibility, the extent of features that the control device 130 may be configured to perform while operating in the compact mode of the MPS controller application may be expanded in some aspects as compared to the extent of features that the control device 130 may be configured to perform while operating in the classic mode of the MPS controller application.

One aspect in which the extent of features that the control device 130 may be configured to perform while operating in the compact mode of the MPS controller application may be expanded as compared to the extent of features that the control device 130 may be configured to perform while operating in the classic mode of the MPS controller application may be the ability to determine and present suggestions for media content that is relevant to the context determined at block 406. Specifically, because the control device 130 may not be configured to determine a context of the control device 130 while operating in the classic mode of the MPS controller application, the set of options that the control device 130 may provide while operating in the classic mode of the MPS controller application may not support determining and presenting suggestions for media content that is relevant to a context of the control device 130.

Another aspect in which the extent of features that the control device 130 may be configured to perform while operating in the compact mode of the MPS controller application may be expanded as compared to the extent of features that the control device 130 may be configured to perform while operating in the classic mode of the MPS controller application may be the extent to which the MPS controller application may interact with third party applications. As one example, while operating in the compact mode of the MPS controller application, the control device 130 may enable notifications from certain third party applications to be presented via the control device 130, whereas said notifications may be disabled while the control device 130 is operating in the classic mode of the MPS controller application. Specifically, notifications from third party applications that (i) are disabled while the control device 130 is operating in the classic mode of the controller application and that (ii) are relevant to the context determined by the control device 130 at block 406 may be enabled when the control device 130 is operating in the compact mode of the MPS controller application. As another example, while operating in the compact mode of the MPS controller application, the control device 130 may enable certain third party applications plugins, which may not be supported in the classic mode of the MPS controller application. Specifically, third party applications that are relevant to the context determined by the control device 130 at block 406 may be enabled while the control device 130 is operating in the compact mode of the MPS controller application. As yet another example, while operating in the compact mode of the MPS controller application, the control device 130 may allow information collected by third party applications to be ingested by the control device 130. Among other things, this ingested information may inform the control device 130 as to which third party applications the control device 130 may support functionality for based on the determined context. As yet still another example, the control device 130 may, while operating in the compact mode of the MPS controller application, support certain features of third party applications based on the context determined by the control device 130 at block 406. Example features may include presenting media content of certain third party applications on a visualization of the compact mode of the MPS controller application, such as (i) a calendar, (ii) an exercise video or other tutorial video, (iii) a recipe, and (iv) a journal prompt/entry, among various other possibilities. Example features may also include supporting functionality of the certain third party applications, which may be accomplished by utilizing the information collected by the certain third party applications and ingested by the control device 130, as previously described.

In some implementations, a user of the control device 130 may "opt in" to allow these features to be provided by the control device 130 while operating in the compact mode of the MPS controller application, and may define which third party applications the control device 130 may interact with while operating in the compact mode of the MPS controller application. Alternatively, certain of the described features may be provided by the control device 130 automatically upon entering the compact mode of the MPS controller application.

The details of these various features, and how they integrate with other features of the compact mode of the MPS controller application, are described in greater detail below.

Further, in some implementations, the control device 130 may update what operations it is configured to perform while operating in the compact mode of the MPS controller application. For example, if the control device 130 determines that the context has changed, e.g., while in the compact mode of the MPS controller application, then the control device 130 may switch what operations the control device 130 is performing to be tailored to the new context. For instance, if a user of the control device 130 plugs in the control device 130 before going to bed and the control device 130 determines that the context is a bedtime routine, then the control device 130 may provide features that are associated to that context (e.g., by suggesting jazz music for playback by playback devices in the bedroom). Then, in the morning, the control device 130 may determine that the context has changed from a bedtime routine to a morning routine, even without a request from the user of the control device 130 triggering such a determination. Consequentially, the control device 130 may transition from providing features that are associated to a bedtime routine to providing features that are associated with a morning routine (e.g., by automatically causing an alarm to be played back by playback devices of the MPS).

In practice, the control device 130 may provide the subset of options of the set of options for controlling the MPS by (i) enabling functionality of the subset of options and/or by (ii) presenting a visualization of the compact mode of the MPS controller application that is based on the determined context and that includes selectable icons to trigger functionality of the subset of options.

Figure 6:
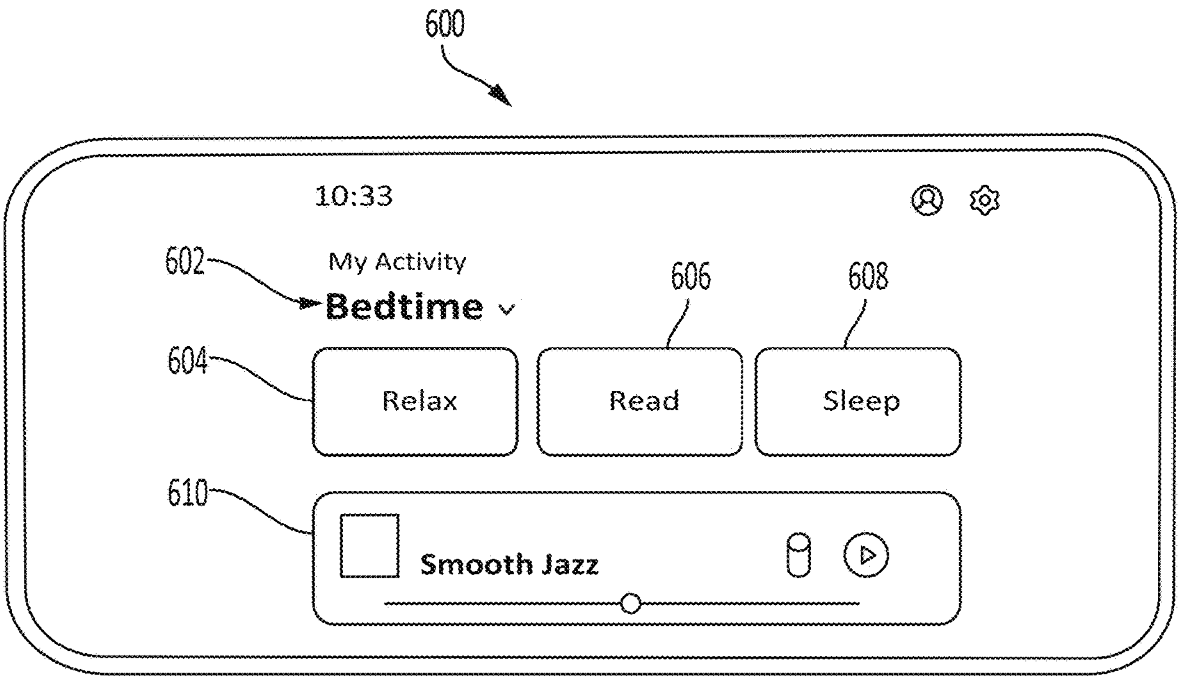
FIG. 6 is a block diagram of the control device of FIG. 4 operating in a compact mode of a media playback system controller application, according to the present disclosure.

FIG. 6 illustrates an example visualization 600 that may be presented via the control device 130 while operating in the compact mode of the MPS controller application, as described with respect to block 410.

As shown, the orientation of the control device 130 has adjusted from a vertical orientation in FIG. 5 to a horizontal orientation in FIG. 6. As previously described, such an adjustment in the orientation of the control device 130 may be interpreted as a request for the control device 130 to operate in the compact mode of the MPS controller application. As may be appreciated, the control device 130 may be triggered to operate in the compact mode of the MPS controller application in various other ways, and the adjusted orientation shown between FIGS. 5 and 6 is intended to show only one possible example of a request for the control device 130 to operate in the compact mode of the MPS controller application.

The control device 130 shown in FIG. 6 has transitioned to operating in the compact mode of the MPS controller application, for example, as described with respect to block 408. Accordingly, the control device 130 may present the example visualization 600 while operating in the compact mode of the MPS controller application. As described below, the example visualization 600 illustrates various features that the control device 130 may facilitate while operating in the compact mode of the MPS controller application for controlling the MPS.

As shown, a context indicator 602 is presented on the example visualization 600. The content indicator 602 may show the context that the control device 130 determined at block 406. For example, as shown, the context indicator 602 shows a "Bedtime" context, which the control device 130 may have determined in any of various manners and based on any of various factors, as previously described.

However, in some implementations, it may be desirable for a user of the control device 130 to have the ability to adjust the context that provides the basis for what subset of options of the set of options for controlling the MPS the control device 130 may be configured to provide while operating in the compact mode of the MPS controller application. For example, it may be possible that the control device 130 may have inaccurately determined the context. Accordingly, the context indicator 602 may include a dropdown menu for user correction of the determined context. As one possibility, user selection of the dropdown menu may cause a set of possible contexts to be presented for the user of the control device 130 to select from. As another possibility, user selection of the dropdown menu may cause a text field or other input field to be presented for the user of the control device 130 to provide input to identify a corrected context. Various other possibilities may also exist. Once the context has been corrected, for example, by selecting a possible context from the set of possible contexts or by inputting a corrected context, the control device 130 may adjust the subset of options to reflect the corrected context.

The example visualization 600 may also include a number of selectable icons that facilitate various MPS control features corresponding to the subset of options of the set of options for controlling the MPS that the control device 130 may be configured to provide while operating in the compact mode of the MPS controller application.

As previously described, the subset of options for controlling the MPS that the control device 130 may be configured to provide while operating in the compact mode of the MPS controller application may comprise a reduced extent of features as compared to the set of options for controlling the MPS that the control device 130 may be configured to provide while operating in the classic mode of the MPS controller application. Accordingly, the number of selectable icons that facilitate various MPS control features corresponding to the subset of options may represent the reduced extent of MPS control features that the control device 130 may provide while operating in the compact mode of the MPS controller application.

A first selectable icon 604, a second selectable icon 606, and a third selectable icon 608 of the number of selectable icons are shown displaying a "Relax" theme, a "Read" theme, and a "Sleep" theme, respectively. Selection of any of the selectable icons 604-608 may cause certain playback devices of the MPS (e.g., a subset of playback devices of the MPS that are located in the bedroom) to play back media content that matches the respective theme of the selected icon. As may be appreciated, the control device 130 may determine which themes to include for the selectable icons 604-608 based on the determined context.

Additionally, the example visualization 600 may also include a playback control interface 610 that facilitates various of the MPS control features corresponding to the subset of options (i.e., a reduced extent of MPS control features as compared to those supported in the classic mode of the MPS controller application). For example, the playback control interface 610 may enable a user of the control device 130 to, via selection of various selectable icons of the playback control interface 610, (i) control the volume of media content played back by one or more playback devices of a subset of playback devices in the MPS, for example, that are located in the bedroom, (ii) control which playback devices in the subset of playback devices of the MPS are configured to play back media content in synchrony, and (iii) control playback of media content played back by the one or more playback devices, among various possibilities.

The example visualization 600 may enable a user to interact with the MPS controller application to control playback of media content in a simple, easy to navigate manner as compared to the classic mode of the MPS controller application. Further, although the example visualization 600 shows selectable icons for a subset of options that are based on the bedtime routine context, the control device 130 may provide other visualizations for different subsets of options that are based on other determined contexts, and that may enable similarly convenient control options. To illustrate with an example, a user of the control device 130 may settle into her office to work for the day, and, to improve her productivity, may place the control device 130 in a horizontal orientation to request that the control device 130 operate in the compact mode of the MPS controller application. Accordingly, the control device 130 may determine a "work" context, and may present a visualization similar to the example visualization 600 but that may enable the user to interact with the compact mode of the MPS controller application to control the player(s) in her office, as well as to select quickplay content that is themed based on the work context.

As described above, the extent of features that the control device 130 may be configured to perform while operating in the compact mode of the MPS controller application may be expanded as compared to the extent of features that the control device 130 may be configured to perform while operating in the classic mode of the MPS controller application, and may include features that enable the user of the control device 130 to interact with certain third party applications in various manners.

Figure 7:
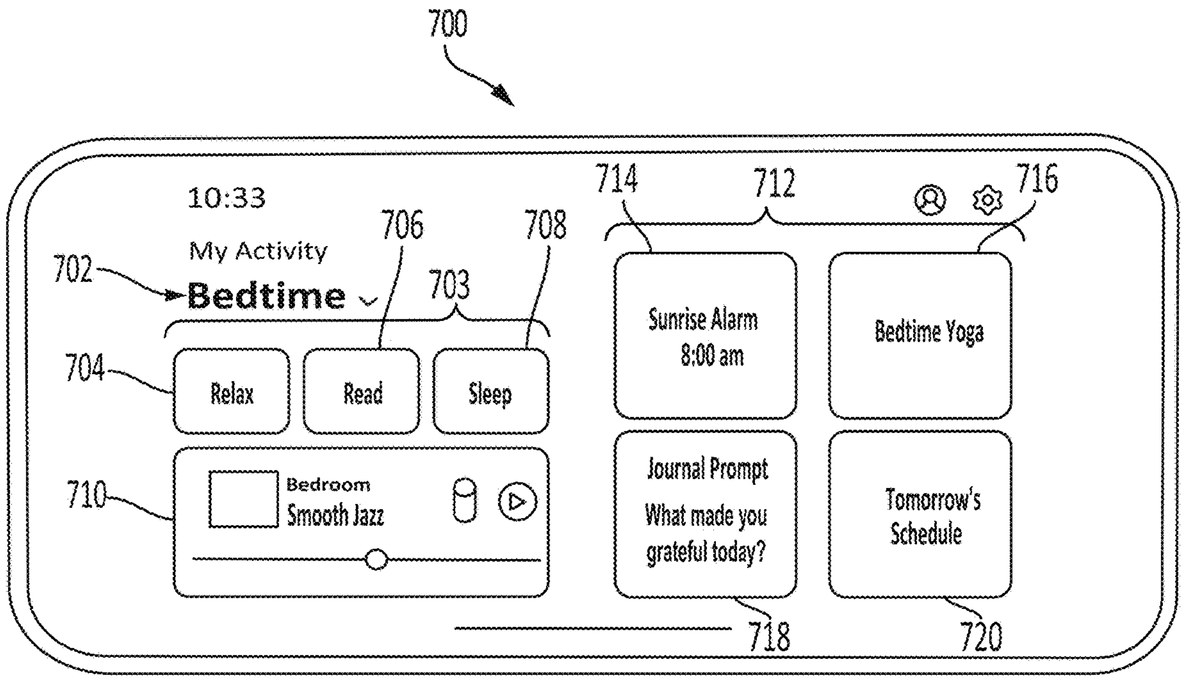
FIG. 7 is a block diagram of the control device of FIG. 4 operating in a compact mode of a media playback system controller application, according to the present disclosure.

Accordingly, FIG. 7 illustrates an example visualization 700 that may be presented via the control device 130 while operating in the compact mode of the MPS controller application and that includes selectable icons for features that enable the user of the control device 130 to interact with certain third party applications in various manners.

The example visualization 700 is shown with a context indicator 702 that may match the context indicator 602 of FIG. 6. Further, the example visualization 700 is shown with a first portion 703 that includes selectable icons 704, 706, and 708, as well as a playback control interface 710 that may match the selectable icons 604, 606, and 608, and the playback control interface 610 of FIG. 6, respectively.

Additionally, the example visualization 700 includes a second portion 712 that may include various selectable icons for certain third party applications. As shown, the second portion includes (i) an alarm selectable icon 714, which may present and facilitate various functionality of a third party alarm application, (ii) an exercise selectable icon 716, which may present and facilitate various functionality of a third party exercise application, (iii) a journaling selectable icon 718, which may present and facilitate various functionality of a third party journaling application, and (iv) a calendar selectable icon 720, which may present and facilitate various functionality of a third party calendar application.

In line with the description above, functionality of each of the third party applications represented by the selectable icons 714-720 may be provided by the control device 130 while operating in the compact mode of the MPS controller application. Accordingly, various background operations, such as ingesting information collected and transmitted via the third party applications, presenting notifications associated with the third party applications, and other operations, may be performed by the control device 130 while operating in the compact mode of the MPS controller application.

Further, as previously described, the third party applications represented by the selectable icons 714-720 may be selected for inclusion in the second portion 712 based on (i) user preference, (ii) usage history, and/or (iii) the relevance of the third party applications to the determined context. For example, the user of the control device 130 may have user accounts for each of the third party applications, and may use them as part of her bedtime routine. Accordingly, the control device 130 may identify and suggest (i.e., present selectable icons for) the third party applications when operating in the compact mode of the MPS controller application based on determining the bedtime routine context. In some implementations, other third party applications may also be relevant to the bedtime routine context, such as a third party internet of things ("IoT") application that may enable the user of the control device 130 to control smart lights, fans, thermostats, scent diffusing systems, alarm systems, etc. in the bedroom or elsewhere (e.g., to turn off lights and/or lock doors in a home as part of a bedtime routine). To illustrate with an example, a user of the control device 130 may settle into a bedtime routine, and may press and hold a button on the control device 130 to request that the control device 130 operate in the compact mode of the MPS controller application. Accordingly, the control device 130 may determine a "bedtime routine" context, and may present a visualization similar to the example visualization 700 but that may enable the user to interact with various IoT devices. For instance, the user may select selectable icons for controlling lights, scents, and audio content playback in the bedroom, for example, to trigger a slow fade of the lights, scents, and/or music in the room as part of the bedtime routine. Further details of a scent diffusing system may be found in U.S. patent application Ser. No. 18/096,423, which is incorporated herein by reference in its entirety.

As with the example visualization 600 of FIG. 6, although the example visualization 700 shows selectable icons that are based on the bedtime routine context, the control device 130 may provide other visualizations that are based on different contexts. To illustrate with an example, the control device 130 may determine that a request to operate in the compact mode of the MPS controller application is made during a dinner context, and may present a visualization with selectable icons that facilitate MPS controls and third party application integrations that are based on the dinner context. For instance, the control device 130 may present a selectable icon for a third party meal prep application, such as "Hello Fresh" or the like, and may facilitate various functionality of the third party meal prep application. Such functionality may include (i) identifying a meal that is to be prepared based on information collected by the third party meal prep application, (ii) presenting a visualization of instructions for preparing the meal, (iii) setting up one or more timers for various stages of the meal prep, and (iv) presenting selectable icons for media content that may be relevant to the context, such as (a) themed cooking audio content and (b) instructional videos for preparing the meal, among various other possibilities. As may be appreciated, this may involve the use of various third party applications, such as (i) a third party alarm application and (ii) a third party media content streaming application, among various other possibilities.

Further, although the first portion 703 includes selectable icons that facilitate MPS control functionality of the control device 130, at least some of the functionality that may be facilitated by the control device 130 while operating in the compact mode of the MPS controller application may not involve the MPS. For example, the third party journaling application represented by the journaling selectable icon 718 and the third party calendar application represented by the calendar selectable icon 720 may not involve any MPS-related functionality. As another example, various IoT device controls that may be facilitated by the control device 130 while operating in the compact mode of the MPS controller application (e.g., lighting devices, scent-dispensing devices, etc.) may, at least in some situations, not involve the MPS.

Returning to FIG. 4, at block 412, the control device 130 may, while presenting the visualization of the compact mode of the MPS controller application, receive user input indicating a selection of a selectable icon of a visualization presented by the control device 130 while operating in the compact mode of the MPS controller application. Referring back to the example visualization 700, the input may be the selection of any of the selectable icons 704-708 and 714-720, as well as a selection of any of the various selectable icons of the playback control interface 710.

At block 414, the control device 130 may, based on the user input, cause at least a first playback device of the MPS controlled by the control device 130 to play back media content that is identified by the control device 130 based on the selection of the selectable icon. As one example, if the selectable icon 704 is selected, then the control device 130 may cause at least a first playback device of the MPS to play back relax-themed media content.

Figure 8:
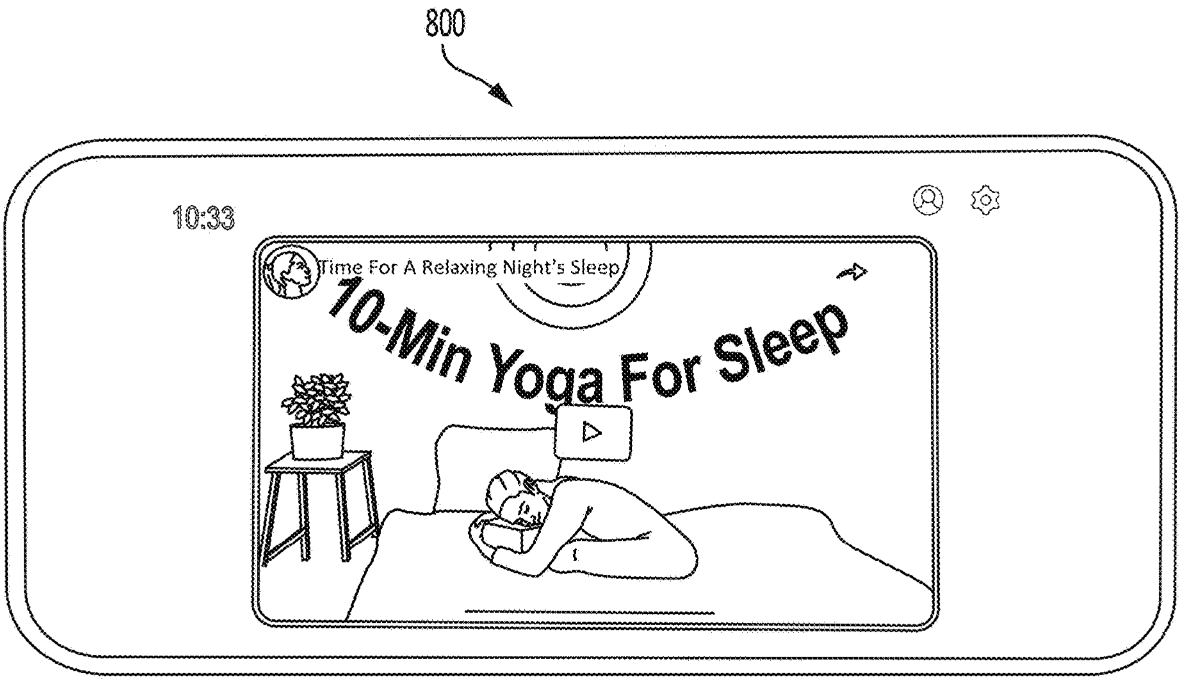
FIG. 8 is a block diagram of the control device of FIG. 4 operating in a compact mode of a media playback system controller application and presenting a visualization for a third party application, according to the present disclosure.
Figure 9:
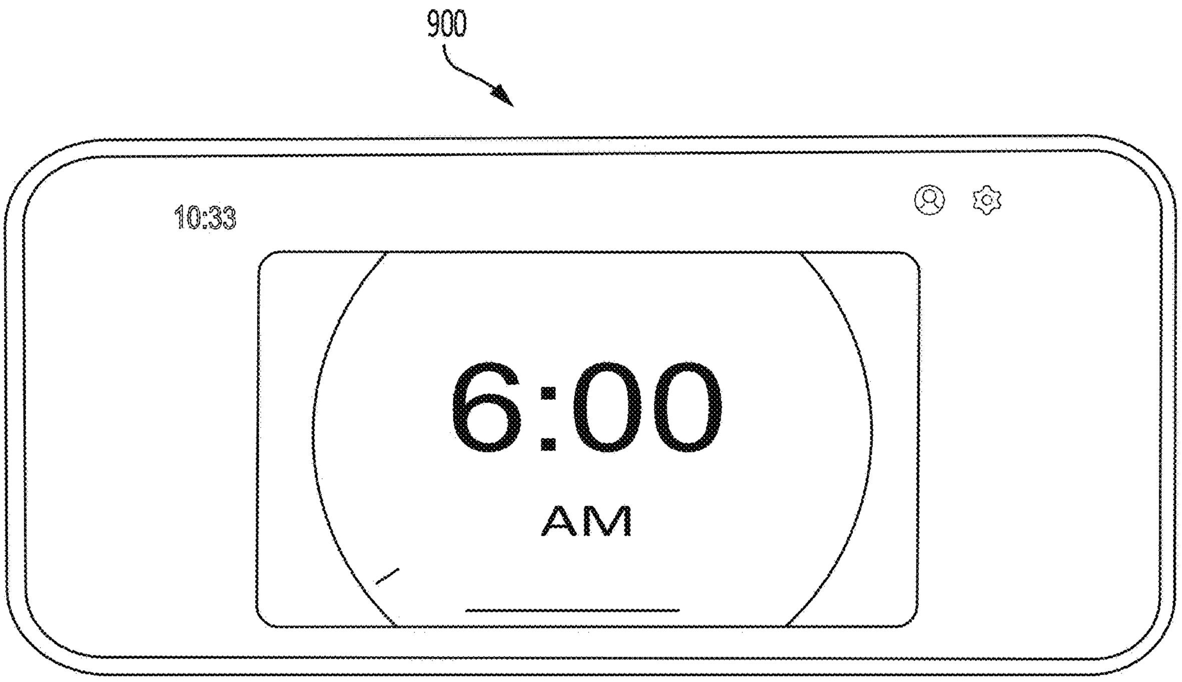
FIG. 9 is a block diagram of the control device of FIG. 4 operating in a compact mode of a media playback system controller application and presenting a visualization for a third party application, according to the present disclosure.
Figure 10:
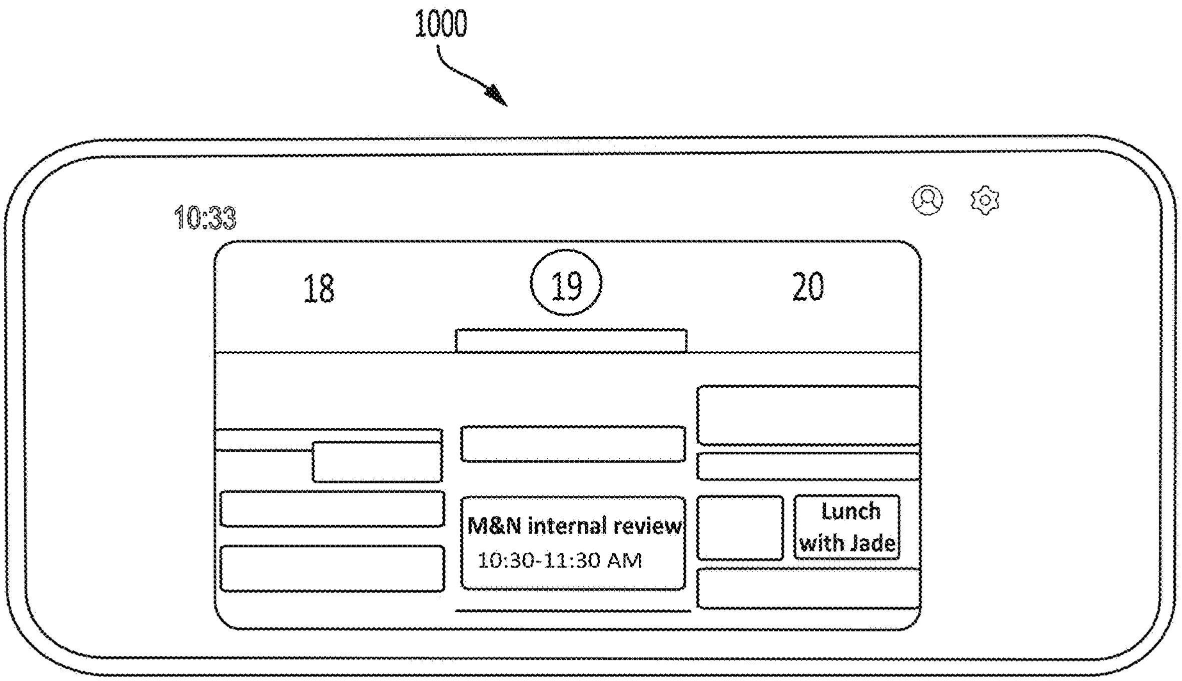
FIG. 10 is a block diagram of the control device of FIG. 4 operating in a compact mode of a media playback system controller application and presenting a visualization for a third party application, according to the present disclosure.

Further, in addition to or instead of causing at least a first playback device of the MPS to play back media content, the control device 130 may perform various other operations, for example, if a selectable icon representing a third party application is selected. FIGS. 8-10 illustrate various visualizations that the control device 130 may present based on selectable icons representing certain third party applications being selected, as well as various operations that the control device 130 may perform based on selectable icons representing third party applications being selected.

FIG. 8 shows an example visualization 800 that may be presented via the control device 130 upon selection of the exercise selectable icon 716 of FIG. 7. As shown, the example visualization 800 shows a minimalistic visual presentation for a bedtime yoga instructional video to be presented via the control device 130. Upon selection of the visual presentation for the yoga video, the control device 130 may (i) play the video and (ii) cause audio content for the video to be played back by either (a) the control device 130 or (b) one or more playback devices in the MPS.

FIG. 9 shows an example visualization 900 that may be presented via the control device 130 upon selection of the alarm selectable icon 714 of FIG. 7. As shown, the example visualization 800 shows a minimalistic visual presentation for a morning alarm that may be presented via the control device 130. At the time indicated by the morning alarm, the control device 130 may cause audio content for the alarm to be played back by either (a) the control device 130 or (b) one or more playback devices in the MPS. Further, various other functionality of the third party alarm application may be provided via the control device 130 as well, such as (i) a snooze or dismiss selectable icon being presented on the example visualization 900 when at the time indicated by the morning alarm and (ii) a change in color of the minimalistic visual presentation for the morning alarm at the time indicated by the morning alarm, among various other possibilities.

Alternatively, the alarm selectable icon 714 of FIG. 7 may be a selectable icon for alarms that may be provided as part of the MPS controller application, such as the alarms described with respect to the alarm selectable icon 502 in FIG. 5, rather than for the third party alarm application. Accordingly, the alarm selectable icon 714 may provide a direct button to access alarm settings provided as part of the MPS controller application, which may be presented via the control device 130 upon selection of the alarm selectable icon 714. In such implementations, the alarm settings that may be presented may be tailored to the determined context. For example, only bedtime alarms may be presented upon selection of the alarm selectable icon 714 in a bedtime context. Various other possibilities may also exist.

Further, although FIG. 9 shows the control device 130 as taking the form of a smartphone, as previously described, the control device 130 may take various other forms, such as a smartwatch. Accordingly, the example visualization 900 (as well as any other visualization described) may be presented via the control device 130 comprising a smartwatch. Various other possibilities may also exist.

Further, in instances where the user input indicates a selection of a selectable icon that does not involve the MPS, the control device 130 may perform various other operations, depending on the functionality that is facilitated by the selected icon.

FIG. 10 shows an example visualization 1000 that may be presented via the control device 130 upon selection of the calendar selectable icon 720 of FIG. 7. As shown, the example visualization 1000 shows a minimalistic visual presentation for a calendar that may be presented via the control device 130. In addition to presenting the visual presentation for the calendar, the control device 130 may enable various functionality of the third party calendar application, such as (i) presenting relevant reminders stored in the third party calendar application and (ii) prompting tasks indicated in the calendar, such as by including selectable icons to open additional third party applications, or additional features of the third party calendar application, such as an email feature or the like, among various other possibilities.

Although FIGS. 7-10 describe various functionality related to some example third party applications that may be implemented by the control device 130 while operating in the compact mode of the MPS controller application, in practice, numerous other functionalities and third party applications are also possible.

As one additional implementation, in an office context, the control device 130 may present another example visualization, such as the example visualization 700 of FIG. 7, but that may include functionality relevant to the office context. For example, in addition to or instead of the selectable icons 714-720 shown with respect to FIG. 7, the example visualization that the control device 130 may present in an office context may include selectable icons for things such as (i) a smart office third party application for controlling IoT devices such as lights, thermostats, etc. located in the office, (ii) a virtual meeting third party application (e.g., Zoom™, Microsoft Teams™, etc.) for hosting/joining virtual meetings, and (iii) a calendar third party application, as described with respect to FIGS. 7 and 10, among various other possibilities. Further, the example visualization that the control device 130 may present in the office context may also include selectable icons for controlling playback devices in the office, which may include various functionalities as previously described.

FIG. 4 includes one or more operations, functions, or actions as illustrated by one or more operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowchart 400 shown in FIG. 4, and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIGS. 4 and 6A may represent circuitry and/or machinery that is wired or arranged to perform the specific functions in the process.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Further, the examples described herein may be employed in systems separate and apart from media playback systems such as any Internet of Things (IoT) system comprising an IoT device. An IoT device may be, for example, a device designed to perform one or more specific tasks (e.g., making coffee, reheating food, locking a door, providing power to another device, playing music) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator), a smart home fixture (e.g., a smart faucet, a smart showerhead, smart blinds, and a smart toilet), and a smart speaker (including the network accessible and/or voice-enabled playback devices described above). These IoT systems may also comprise one or more devices that communicate with the IoT device via one or more networks such as one or more cloud servers (e.g., that communicate with the IoT device over a WAN) and/or one or more control devices (e.g., that communicate with the IoT device over a LAN and/or a PAN). Thus, the examples described herein are not limited to media playback systems.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A control device comprising:

at least one processor;

at least one non-transitory computer-readable medium; and program instructions stored on the at least one non-transitory computer-readable medium that are executable by the at least one processor such that the control device is configured to:

operate in a classic mode of a media playback system controller application in which the control device is configured to (i) provide a set of options for controlling a media playback system and (ii) control the media playback system based on user selection of any option of the set of options;

while operating in the classic mode of the media playback system controller application, receive a request to operate in a compact mode of the media playback system controller application;

determine a context in which the control device received the request to operate in the compact mode of the media playback system controller application, wherein the context is associated with listening preference data for a user account associated with the control device;

based on the request, transition from operating in the classic mode of the media playback system controller application to operating in the compact mode of the media playback system controller application such that, after the transition, the control device:

(i) becomes disabled from controlling the media playback system according to at least one option of the set of options;

(ii) becomes configured to provide a subset of options of the set of options for controlling the media playback system, wherein the subset of options is determined based on the determined context and does not include the at least one disabled option of the set of options;

(iii) becomes configured to control the media playback system based on user selection of any option of the subset of options; and (iv) begins presenting a visualization of the compact mode of the media playback system controller application that comprises at least one option of the subset of options, wherein the at least one option of the subset of options comprises an option to play back media content, and wherein the visualization of the compact mode of the media playback system controller application is based on the determined context;

while presenting the visualization of the compact mode of the media playback system controller application, receive user input indicating a selection of the option to play back media content; and based on the user input, cause at least a first playback device of the media playback system to play back media content.

2. The control device of claim 1, further comprising program instructions that are executable by the at least one processor such that the control device is configured to:

prior to transitioning from operating in the classic mode of the media playback system controller application to operating in the compact mode of the media playback system controller application, store a state variable for the classic mode of the media playback system controller application;

while operating in the compact mode of the media playback system controller application, receive a second request to operate in the classic mode of the media playback system controller application; and based on the second request, cease operating in the compact mode of the media playback system controller application and resume operating in the classic mode of the media playback system controller application based on the stored state variable for the classic mode of the media playback system controller application.

3. The control device of claim 1, further comprising program instructions that are executable by the at least one processor such that the control device is configured to, based on transitioning from operating in the classic mode of the media playback system controller application to operating in the compact mode of the media playback system controller application, enable user information associated with a third-party application to be received by the control device.

4. The control device of claim 3, further comprising program instructions that are executable by the at least one processor such that the control device is configured to:

receive user information associated with the third-party application; and based on one or more user inputs, (i) present a service of the third-party application via the visualization of the compact mode of the media playback system controller application and (ii) utilize the user information associated with the third-party application received by the control device.

5. The control device of claim 1, wherein the program instructions that are executable by the at least one processor such that the control device is configured to determine the context in which the control device received the request comprise program instructions that are executable by the at least one processor such that the control device is configured to determine the context based on at least one of (i) a time of day, (ii) a location of the control device in relation to one or more playback devices of the media playback system, or (iii) historical usage data of the control device.

6. The control device of claim 1, further comprising at least one orientation sensor, and wherein the program instructions that are executable by the at least one processor such that the control device is configured to receive the request comprise program instructions that are executable by the at least one processor such that the control device is configured to detect a change in an orientation of the controller device via the at least one orientation sensor.

7. The control device of claim 1, further comprising at least one microphone, and wherein the program instructions that are executable by the at least one processor such that the control device is configured to receive the request comprise program instructions that are executable by the at least one processor such that the control device is configured to detect a voice command via the at least one microphone.

8. The control device of claim 1, wherein the program instructions that are executable by the at least one processor such that the control device is configured to receive the request comprise program instructions that are executable by the at least one processor such that the control device is configured to detect a selection of (i) a selectable icon presented via a visualization of the classic mode of the media playback system controller application or (ii) a button of the control device.

9. The control device of claim 1, wherein the program instructions that are executable by the at least one processor such that the control device is configured to begin presenting the visualization of the compact mode of the media playback system controller application comprise program instructions that are executable by the at least one processor such that the control device is configured to begin presenting the visualization of the compact mode of the media playback system controller application with a screen size that matches a screen size of a visualization of the classic mode of the media playback system controller application.

10. A non-transitory computer-readable medium, wherein the non-transitory computer-readable medium is provisioned with program instructions that, when executed by at least one processor, cause a control device to:

operate in a classic mode of a media playback system controller application in which the control device is configured to (i) provide a set of options for controlling a media playback system and (ii) control the media playback system based on user selection of any option of the set of options;

while operating in the classic mode of the media playback system controller application, receive a request to operate in a compact mode of the media playback system controller application;

determine a context in which the control device received the request to operate in the compact mode of the media playback system controller application, wherein the context is associated with listening preference data for a user account associated with the control device;

based on the request, transition from operating in the classic mode of the media playback system controller application to operating in the compact mode of the media playback system controller application such that, after the transition, the control device:

(i) becomes disabled from controlling the media playback system according to at least one option of the set of options;

(ii) becomes configured to provide a subset of options of the set of options for controlling the media playback system, wherein the subset of options is determined based on the determined context and does not include the at least one disabled option of the set of options;

(iii) becomes configured to control the media playback system based on user selection of any option of the subset of options; and (iv) begins presenting a visualization of the compact mode of the media playback system controller application that comprises at least one option of the subset of options, wherein the at least one option of the subset of options comprises an option to play back media content, and wherein the visualization of the compact mode of the media playback system controller application is based on the determined context;

while presenting the visualization of the compact mode of the media playback system controller application, receive user input indicating a selection of the option to play back media content; and based on the user input, cause at least a first playback device of the media playback system to play back media content.

11. The non-transitory computer-readable medium of claim 10, wherein the non-transitory computer-readable medium is also provisioned with program instructions that, when executed by the at least one processor, cause the control device to:

prior to transitioning from operating in the classic mode of the media playback system controller application to operating in the compact mode of the media playback system controller application, store a state variable for the classic mode of the media playback system controller application;

while operating in the compact mode of the media playback system controller application, receive a second request to operate in the classic mode of the media playback system controller application; and based on the second request, cease operating in the compact mode of the media playback system controller application and resume operating in the classic mode of the media playback system controller application based on the stored state variable for the classic mode of the media playback system controller application.

12. The non-transitory computer-readable medium of claim 10, wherein the non-transitory computer-readable medium is also provisioned with program instructions that, when executed by the at least one processor, cause the control device to, based on transitioning from operating in the classic mode of the media playback system controller application to operating in the compact mode of the media playback system controller application, enable user information associated with a third-party application to be received by the control device.

13. The non-transitory computer-readable medium of claim 12, wherein the non-transitory computer-readable medium is also provisioned with program instructions that, when executed by the at least one processor, cause the control device to:

receive user information associated with the third-party application; and based on one or more user inputs, (i) present a service of the third-party application via the visualization of the compact mode of the media playback system controller application and (ii) utilize the user information associated with the third-party application received by the control device.

14. The non-transitory computer-readable medium of claim 10, wherein the program instructions that, when executed by the at least one processor, cause the control device to determine the context in which the control device received the request comprise program instructions that, when executed by the at least one processor, cause the control device to determine the context based on at least one of (i) a time of day, (ii) a location of the control device in relation to one or more playback devices of the media playback system, or (iii) historical usage data of the control device.

15. The non-transitory computer-readable medium of claim 10, wherein the program instructions that, when executed by the at least one processor, cause the control device to receive the request comprise program instructions that, when executed by the at least one processor, cause the control device to detect a selection of (i) a selectable icon presented via a visualization of the classic mode of the media playback system controller application or (ii) a button of the control device.

16. The non-transitory computer-readable medium of claim 10, wherein the program instructions that, when executed by the at least one processor, cause the control device to begin presenting the visualization of the compact mode of the media playback system controller application comprise program instructions that, when executed by the at least one processor, cause the control device to begin presenting the visualization of the compact mode of the media playback system controller application with a screen size that matches a screen size of a visualization of the classic mode of the media playback system controller application.

17. A method carried out by a control device, the method comprising:

operating in a classic mode of a media playback system controller application in which the control device is configured to (i) provide a set of options for controlling a media playback system and (ii) control the media playback system based on user selection of any option of the set of options;

while operating in the classic mode of the media playback system controller application, receiving a request to operate in a compact mode of the media playback system controller application;

determining a context in which the control device received the request to operate in the compact mode of the media playback system controller application, wherein the context is associated with listening preference data for a user account associated with the control device;

based on the request, transitioning from operating in the classic mode of the media playback system controller application to operating in the compact mode of the media playback system controller application such that, after the transition, the control device:

(i) becomes disabled from controlling the media playback system according to at least one option of the set of options;

(ii) becomes configured to provide a subset of options of the set of options for controlling the media playback system, wherein the subset of options is determined based on the determined context and does not include the at least one disabled option of the set of options;

(iii) becomes configured to control the media playback system based on user selection of any option of the subset of options; and (iv) begins presenting a visualization of the compact mode of the media playback system controller application that comprises at least one option of the subset of options, wherein the at least one option of the subset of options comprises an option to play back media content, and wherein the visualization of the compact mode of the media playback system controller application is based on the determined context;

while presenting the visualization of the compact mode of the media playback system controller application, receiving user input indicating a selection of the option to play back media content; and based on the user input, causing at least a first playback device of the media playback system to play back media content.

18. The method of claim 17, further comprising:

prior to transitioning from operating in the classic mode of the media playback system controller application to operating in the compact mode of the media playback system controller application, storing a state variable for the classic mode of the media playback system controller application;

while operating in the compact mode of the media playback system controller application, receiving a second request to operate in the classic mode of the media playback system controller application; and based on the second request, ceasing operating in the compact mode of the media playback system controller application and resuming operating in the classic mode of the media playback system controller application based on the stored state variable for the classic mode of the media playback system controller application.

19. The method of claim 17, further comprising:

based on transitioning from operating in the classic mode of the media playback system controller application to operating in the compact mode of the media playback system controller application, enabling user information associated with a third-party application to be received by the control device.

20. The method of claim 19, further comprising, based on one or more user inputs:

presenting a service of the third-party application via the visualization of the compact mode of the media playback system controller application;

receiving user information associated with the third-party application; and utilizing the user information associated with the third-party application received by the control device.

* * * * *